(12) United States Patent
Trisnadi et al.

(10) Patent No.: US 12,124,052 B2
(45) Date of Patent: Oct. 22, 2024

(54) DYNAMIC INCOUPLING GRATINGS IN IMAGING SYSTEMS

(71) Applicant: Magic Leap, Inc., Plantation, FL (US)

(72) Inventors: Jahja I. Trisnadi, Cupertino, CA (US); Pierre St. Hilaire, Belmont, CA (US); Clinton Carlisle, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 805 days.

(21) Appl. No.: 17/184,039

(22) Filed: Feb. 24, 2021

(65) Prior Publication Data

US 2021/0255471 A1 Aug. 19, 2021

Related U.S. Application Data

(63) Continuation of application No. PCT/US2019/048642, filed on Aug. 28, 2019.
(Continued)

(51) Int. Cl.
*G02B 27/42* (2006.01)
*G02B 27/00* (2006.01)
(Continued)

(52) U.S. Cl.
CPC ..... *G02B 27/4205* (2013.01); *G02B 27/0081* (2013.01); *G02B 27/0172* (2013.01); *H04N 9/3155* (2013.01); *G02B 2027/0123* (2013.01)

(58) Field of Classification Search
CPC ........... G02B 27/4205; G02B 27/0081; G02B 27/0172; G02B 2027/0123; H04N 9/3155
See application file for complete search history.

(56) References Cited

U.S. PATENT DOCUMENTS

2014/0300966 A1   10/2014   Travers
2015/0177591 A1*  6/2015   Sugiyama .......... G02B 27/0093
                                                                        359/298
(Continued)

FOREIGN PATENT DOCUMENTS

CN    112601587    4/2021
EP    2751611     1/2018
(Continued)

OTHER PUBLICATIONS

Application No. EP19854773.9, Extended European Search Report, Mailed on Aug. 27, 2021, 9 pages.
(Continued)

*Primary Examiner* — Cara E Rakowski
(74) *Attorney, Agent, or Firm* — KILPATRICK TOWNSEND & STOCKTON LLP

(57) ABSTRACT

An eyepiece for projecting an image light field to an eye of a viewer for forming an image of virtual content includes a waveguide, a light source configured to deliver a light beam to be incident on the waveguide, a controller coupled to the light source and configured to modulate an intensity of the light beam in a plurality of time slots, a dynamic input coupling grating (ICG) configured to, for each time slot, diffract a respective portion of the light beam into the waveguide at a respective total internal reflection (TIR) angle corresponding to a respective field angle, and an outcoupling diffractive optical element (DOE) configured to diffract each respective portion of the light beam out of the waveguide toward the eye at the respective field angle, thereby projecting the light field to the eye of the viewer.

19 Claims, 17 Drawing Sheets

Related U.S. Application Data

(60) Provisional application No. 62/723,688, filed on Aug. 28, 2018.

(51) Int. Cl.
  *G02B 27/01* (2006.01)
  *H04N 9/31* (2006.01)

(56) References Cited

U.S. PATENT DOCUMENTS

| | | | |
|---|---|---|---|
| 2016/0004090 A1* | 1/2016 | Popovich | G02B 27/0172 359/567 |
| 2016/0286204 A1* | 9/2016 | Grata | H04N 13/344 |
| 2018/0074457 A1 | 3/2018 | Jolly et al. | |
| 2018/0299678 A1 | 10/2018 | Singer et al. | |

FOREIGN PATENT DOCUMENTS

| | | |
|---|---|---|
| EP | 3843866 | 7/2021 |
| JP | 1152284 A | 2/1999 |
| JP | 2017090561 A | 5/2017 |
| JP | 2018503871 A | 2/2018 |
| WO | 2011051660 A1 | 5/2011 |
| WO | 2013033274 A1 | 3/2013 |
| WO | 2016109599 A1 | 7/2016 |
| WO | 2017102795 A1 | 6/2017 |
| WO | 2018081636 | 5/2018 |
| WO | 2018102445 | 6/2018 |
| WO | 2020047150 | 3/2020 |

OTHER PUBLICATIONS

International Application No. PCT/US2019/048642, International Preliminary Report on Patentability mailed on Mar. 11, 2021, 7 pages.
International Application No. PCT/US2019/048642, International Search Report and Written Opinion mailed on Nov. 20, 2019, 8 pages.
European Patent Application No. 23160139.4, "Extended European Search Report", Jun. 27, 2023, 5 pages.
Japanese Application No. 2021-510431, "Office Action" and English translation, May 26, 2023, 10 pages.
CN201980055880.3, "Office Action", Dec. 26, 2023, 10 pages. [no translation available].
JP2021-510431, "Office Action" and English translation, Oct. 11, 2023, 12 pages.
JP2021-510431, "Notice of Allowance", Mar. 12, 2024, 3 pages. [no translation available].

* cited by examiner

DYNAMIC INCOUPLING GRATINGS IN IMAGING SYSTEMS

CROSS-REFERENCES TO RELATED APPLICATIONS

This application is a continuation of International Patent Application No. PCT/US2019/048642, filed Aug. 28, 2019, entitled "DYNAMIC INCOUPLING GRATINGS IN IMAGING SYSTEMS," which claims the benefit of and priority to U.S. Provisional Patent Application No. 62/723,688, filed Aug. 28, 2018, entitled "DYNAMIC INCOUPLING GRATINGS IN IMAGING SYSTEMS," the entire disclosures of which are hereby incorporated by reference, for all purposes, as if fully set forth herein.

BACKGROUND OF THE INVENTION

Various imaging systems, such as spatial-light-modulator (SLM) based projectors, microelectromechanical systems (MEMS) scanners, and fiber scanners, have been considered for providing imagewise modulated light in an augmented reality eyewear that includes an eyepiece. Despite significant progress, it has become increasingly difficult to reduce a size of the illumination system. Therefore a new scalable imaging architecture that allows further miniaturization is needed.

SUMMARY OF THE INVENTION

Eyepieces and related methods are disclosed that employ a dynamic input coupling grating (ICG) to couple an input light beam into a waveguide and to controllably scan in the input light beam to form an image light field that is output from the waveguide to an eye of a viewer. In many embodiments, the intensity of the input light beam is modulated in conjunction with the scanning of the input light beam via the dynamic ICG to generate the image light field as a combination of time segments of the input light beam scanned to respective X and Y coordinate positions in the image light field. By using simultaneous modulation of the input light beam and corresponding scanning of the modulated input light beam, a simplified light source can be used that propagates the input light beam along a fixed one-dimensional propagation path, thereby allowing the light source to have reduced size relative to devices and approaches in which a two-dimensional light field is transmitted onto a non-dynamic input coupling grating.

According to some embodiments, eyepiece for projecting an image light field to an eye of a viewer includes a waveguide, a dynamic input coupling grating (ICG), a light source, a controller, and an exit pupil expander. The waveguide is configured to propagate light via internal reflection. The dynamic ICG is formed on a first lateral region of the waveguide. The light source is configured to generate a light beam transmitted to the dynamic ICG. The controller is coupled to the light source and the dynamic ICG. The controller is configured to modulate an intensity of the light beam in a sequence of time slots. Each time slot of the sequence of time slots corresponds to a respective field angle of the image light field. The intensity of the light beam in each time slot of the sequence of time slots corresponds to an intensity of the image light field at the respective field angle. The controller is configured to control the dynamic ICG to, for each time slot of the sequence of time slots, diffract a respective portion of the light beam into the waveguide at a respective angle corresponding to the respective field angle. The exit pupil expander is coupled to a second lateral region of the waveguide and configured to direct each respective portion of the light beam out of the waveguide toward the eye of the viewer at the respective field angle, thereby projecting the image light field to the eye of the viewer.

According to some embodiments, a method of projecting an image light field to an eye of a viewer is provided. The method includes modulating, by a controller, an intensity of a light beam in a sequence of time slots. Each time slot of the sequence of time slots corresponds to a respective field angle of the image light field. The intensity of the light beam in each time slot of the sequence of time slots corresponding to an intensity of the image light field at the respective field angle. The light beam is propagated onto a dynamic input coupling grating (ICG). The dynamic ICG is controlled, by a controller, to diffract a respective portion of the light beam into a waveguide at a respective angle corresponding to the respective field angle for each time slot of the sequence of time slots. Each respective portion of the light beam is directed out of the waveguide toward the eye at the respective field angle, thereby projecting the image light field to the eye of the viewer.

In an embodiment, the dynamic ICG comprises a surface acoustic wave (SAW) modulator coupled to an oscillating electric signal source and the method includes controlling operation of the oscillating electric signal source, by the controller, to supply an oscillating electric signal to the SAW modulator to generate respective acoustic waves that propagate on a surface of the SAW modulator such that the SAW modulator diffracts the respective portion of the light beam into the waveguide at the respective angle in each respective time slot.

As an example, the SAW modulator can include a substrate and a piezoelectric transducer attached to the substrate. The oscillating electric signal can be supplied to the piezoelectric transducer to generate the respective acoustic waves and the respective acoustic waves propagate on a surface of the substrate. In another exemplary embodiment, the SAW modulator includes a substrate, a first transducer attached to the substrate, and a second transducer attached to the substrate. The first transducer is configured to vibrate in a first axis, the second transducer is configured to vibrate in a second axis orthogonal to the first axis, and the first transducer and the second transducer are coupled to the oscillating electric signal source to drive the first transducer and the second transducer to generate the respective acoustic waves.

In a particular embodiment, the SAW modulator includes a substrate including a material that exhibits a piezoelectric effect that generates the respective acoustic waves. The material that exhibits the piezoelectric effect can include one of fused silica, lithium niobate, arsenic trisulfide, tellurium dioxide, tellurite glass, or lead silicate. The SAW modulator can be an integral part of the waveguide. The light beam can be incident on a surface of the dynamic ICG in a direction perpendicular to the surface of the dynamic ICG. The light beam can alternatively be incident on a surface of the dynamic ICG at a non-zero bias angle relative to a direction perpendicular to the surface of the dynamic ICG. In some implementations, the dynamic ICG operates in a transmission mode, whereas in other implementations, the dynamic ICG operates in a reflection mode.

The method can include redirecting the light beam via a static grating coupled to the waveguide. The static grating can be configured to diffract a portion of the light beam towards the dynamic ICG at a non-zero bias angle relative to a direction perpendicular to a surface of the dynamic ICG. The method can further include modulating, by the controller, an intensity of a second light beam in the sequence of time slots, propagating the second light beam onto the dynamic ICG, controlling the dynamic ICG, by the controller, to diffract a respective portion of the second light beam into the waveguide at a respective angle, and directing each respective portion of the second light beam out of the waveguide toward the eye at the respective field angle. The light beam can be incident on a surface of the dynamic ICG via propagation of the light beam in a first direction, the intensities of the light beam in the sequence of time slots can correspond to intensities of the image light field in a first range of angular field of view (FOV), the second light beam can be incident on the surface of the dynamic ICG via propagation of the second light beam in a second direction different from the first direction, and wherein the intensities of the second light beam in the sequence of time slots correspond to intensities of the image light field in a second range of angular FOV different from the first range of angular FOV.

In an embodiment, the waveguide can be transparent so that the image light field is superimposed on an external image transmitted through the waveguide to the eye of the viewer. Moreover, each respective portion of the light beam can be directed out of the waveguide toward the eye at the respective field angle via a diffractive optical element (DOE) configured to diffract each respective portion of the light beam out of the waveguide toward the eye at the respective field angle. The light beam can propagate to the dynamic ICG on an optical axis having a fixed position and orientation relative to the dynamic ICG.

According to some embodiments, an eyepiece for projecting an image light field to an eye of a viewer for forming an image of virtual content includes a waveguide configured to propagate light therein. The waveguide may include an input pupil. The eyepiece may further include a light source configured to deliver a light beam to be incident on the waveguide at the input pupil, and a controller coupled to the light source and configured to modulate an intensity of the light beam in a plurality of time slots. Each time slot may correspond to a respective field angle of the image. The intensity of the light beam in each time slot may correspond to an intensity of the image at the respective field angle. The eyepiece may further include a dynamic input coupling grating (ICG) formed on a first lateral region of the waveguide corresponding to the input pupil. The dynamic ICG may be configured to, for each time slot, diffract a respective portion of the light beam into the waveguide at a respective total internal reflection (TIR) angle corresponding to a respective field angle, and scan the TIR angle from one time slot to a next time slot in accordance with modulation of the light beam. The eyepiece may further include an outcoupling diffractive optical element (DOE) coupled to a second lateral region of the waveguide and configured to diffract each respective portion of the light beam out of the waveguide toward the eye at the respective field angle, thereby projecting the light field to the eye of the viewer.

In an embodiment, the dynamic ICG can include a surface acoustic wave (SAW) modulator that includes a layer of a piezoelectric material and a transducer coupled to an oscillating electric signal source. The oscillating electric signal source is configured in this embodiment to drive the transducer at a plurality of frequencies. Each respective frequency corresponds to a respective time slot, thereby creating a respective sound wave in the layer of the piezoelectric material with a respective spatial period, such that the dynamic ICG diffracts the respective portion of the light beam into the waveguide at the respective TIR angle in the respective time slot. The transducer can be a piezoelectric transducer. The transducer can include a first transducer configured to vibrate in a first axis and a second transducer configured to vibrate in a second axis orthogonal to the first axis. The piezoelectric material can include one of fused silica, lithium niobate, arsenic trisulfide, tellurium dioxide, tellurite glass, or lead silicate. The waveguide can include one of fused silica, lithium niobate, arsenic trisulfide, tellurium dioxide, tellurite glass, or lead silicate. In some embodiments, the layer of the piezoelectric material is an integral part of the waveguide. As an example, the light beam can be incident on the waveguide substantially at normal incidence. In some implementations, the light beam is incident on the waveguide at a non-zero bias angle. The dynamic ICG can operate in a transmission mode or in a reflection mode.

The eyepiece can further include a static grating coupled to the waveguide at the input pupil and configured to receive the light beam and diffract a portion of the light beam at a bias angle toward the dynamic ICG. The light beam can be incident on the waveguide at a first incidence angle and the intensities of the light beam in the plurality of time slots can correspond to intensities of the image in a first range of angular field of view (FOV). The light source can be further configured to deliver a second light beam incident on the waveguide at the input pupil at a second incidence angle different from the first incidence angle. In this implementation, the light source is further configured to modulate an intensity of the second light beam in the plurality of time slots, each time slot corresponding to a respective field angle, and the intensities of the second light beam in the plurality of time slots correspond to intensities of the image in a second range of angular FOV different from the first angular FOV.

According to some embodiments, a method of projecting a light field to an eye of a viewer for viewing an image of virtual content includes providing a light beam incident on a dynamic input coupling grating (ICG). The dynamic ICG may include a surface acoustic wave (SAW) modulator. The SAW modulator may include a layer of a piezoelectric material and a transducer. The SAW modulator may be coupled to a first lateral region of a waveguide. The method may further include modulating an intensity of the light beam in a plurality of time slots corresponding to a plurality of field angles. The intensity of the light beam in each time slot may correspond to an intensity of the image at a respective field angle. The method may further include applying oscillating electric signals to the transducer at a plurality of frequencies in the plurality of time slots, thereby creating a respective sound wave in the layer of the piezoelectric material with a respective spatial period in the respective time slot, such that the dynamic ICG diffracts a respective portion the light beam into the waveguide at a respective total internal reflection (TIR) angle in the respective time slot. Each respective frequency may correspond to a respective time slot. The respective portion of the light beam may be propagated in the waveguide. The method may further include outcoupling, using a diffractive optical element (DOE) coupled to a second lateral region of the waveguide, each respective portion of the light beam propagating in the waveguide toward the eye at the respective field angle, thereby projecting the light field at the plurality of field angles to the eye for viewing the image of the virtual content.

DETAILED DESCRIPTION OF SPECIFIC EMBODIMENTS

According to some embodiments of the present disclosure, an eyepiece includes a waveguide and a dynamic input coupling grating (ICG) coupled to the waveguide. The dynamic ICG is configured to scan a fixed input laser beam into a range of two-dimensional TIR angles in the waveguide. By modulating the laser beam intensity in a sequence of time slots as a function of image point locations in a field of view, which is synchronized with the scanning of the dynamic ICG, a viewer may see a full image field display. This imaging paradigm may eliminate the need for an external projector, and therefore may afford a compact, lightweight eyewear. Such an eyewear may be used, for example, in an augmented reality system or other wearable display and computing products.

A diffraction grating is an optical component that deflects light by an angle that is dependent on the wavelength of light and the angle of incidence on the grating. A diffraction grating may have a periodic structure with a period that is on the order of the wavelength of light with which the diffraction grating is to be used. The periodic structure can be a surface relief profile or a volume modulation of the index of refraction of a transparent material. The operation of a diffraction grating may be governed by the grating equation:

$$\theta_m = \arcsin\left(\frac{m\lambda}{d} - \sin(\theta_i)\right)$$

where $\theta_m$ is the angle of a light beam exiting the diffraction grating (diffraction angle) relative to a vector normal to the surface of the grating; $\lambda$ is the wavelength; m is an integer valued parameter known as the diffraction "order"; d is the period of the grating; and $\theta_i$ is the angle of incidence of an input light beam relative to the vector normal to the surface of the grating.

Gratings may also be blazed, i.e., given a particular periodic profile so as to concentrate the light they diffract into a particular "order" specified by a particular value of the order parameter m. Gratings may be reflective in which case light departs the grating on the same side that light is incident on the grating, or transmissive in which case light exits primarily on a side of the grating opposite from which the light is incident.

Figure 1A:
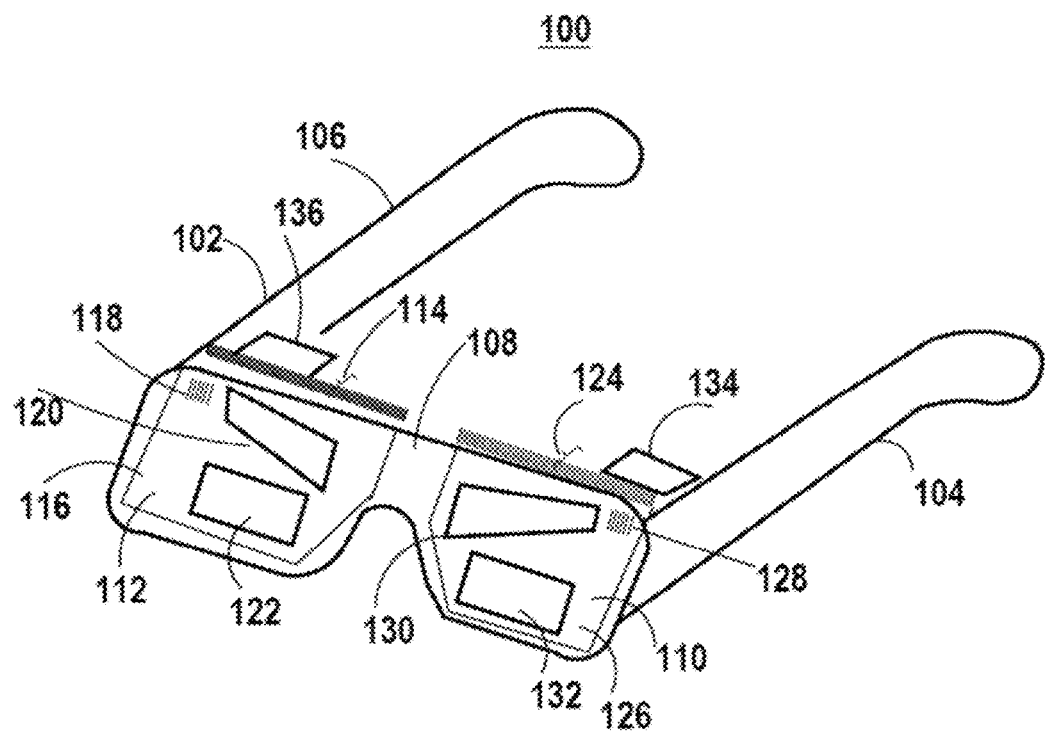
FIG. 1A is a schematic perspective view of a pair of augmented reality glasses, according to some embodiments.

FIG. 1A is a perspective view of a pair of augmented reality glasses 100 according to some embodiments. The glasses 100 include a frame 102 including a left arm 104 and a right arm 106 connected by a front piece 108. The front piece 108 supports a left eyepiece 110 and a right eyepiece 112. Referring in particular to the right eyepiece 112 for the purpose of discussion, the right eyepiece 112 includes a right stack of a plurality of waveguides 114. The right stack of waveguides 114 is transparent so that a person wearing the glasses 100 can see the real world while wearing the augmented reality glasses 100 and virtual content can be superimposed and displayed in context with the real world. As illustrated in FIG. 1 a right front waveguide 116 included in the right stack waveguides 114 includes a right front selectively actuable in-coupling grating 118, a right front orthogonal pupil expander 120, and a right front exit pupil expander 122. As discussed in U.S. Pat. No. 9,612,403 to Abovitz et al., entitled "Planar Waveguide Apparatus with Diffraction element(s) and System Employing Same," the exit pupil expander 122 can be designed to impart different field curvature corresponding to different virtual source light to exiting light. Similarly, the left eyepiece 110 includes a left stack of waveguides 124 including a left front waveguide 126. As illustrated in FIG. 1, the left front waveguide includes a left-front selectively actuable in-coupling grating 128, a left-side orthogonal pupil expander 130, and a left-side exit pupil expander 132. The left eyepiece 110 is also transparent. A left-side source of imagewise modulated light 134 and a right-side source of imagewise modulated light 136 are supported respectively inboard of the left arm 104 and the right arm 106 of the frame 102 and are selectively optically coupled, respectively to the left stack of waveguides 124 and the right stack of waveguides 114.

Figure 1B:
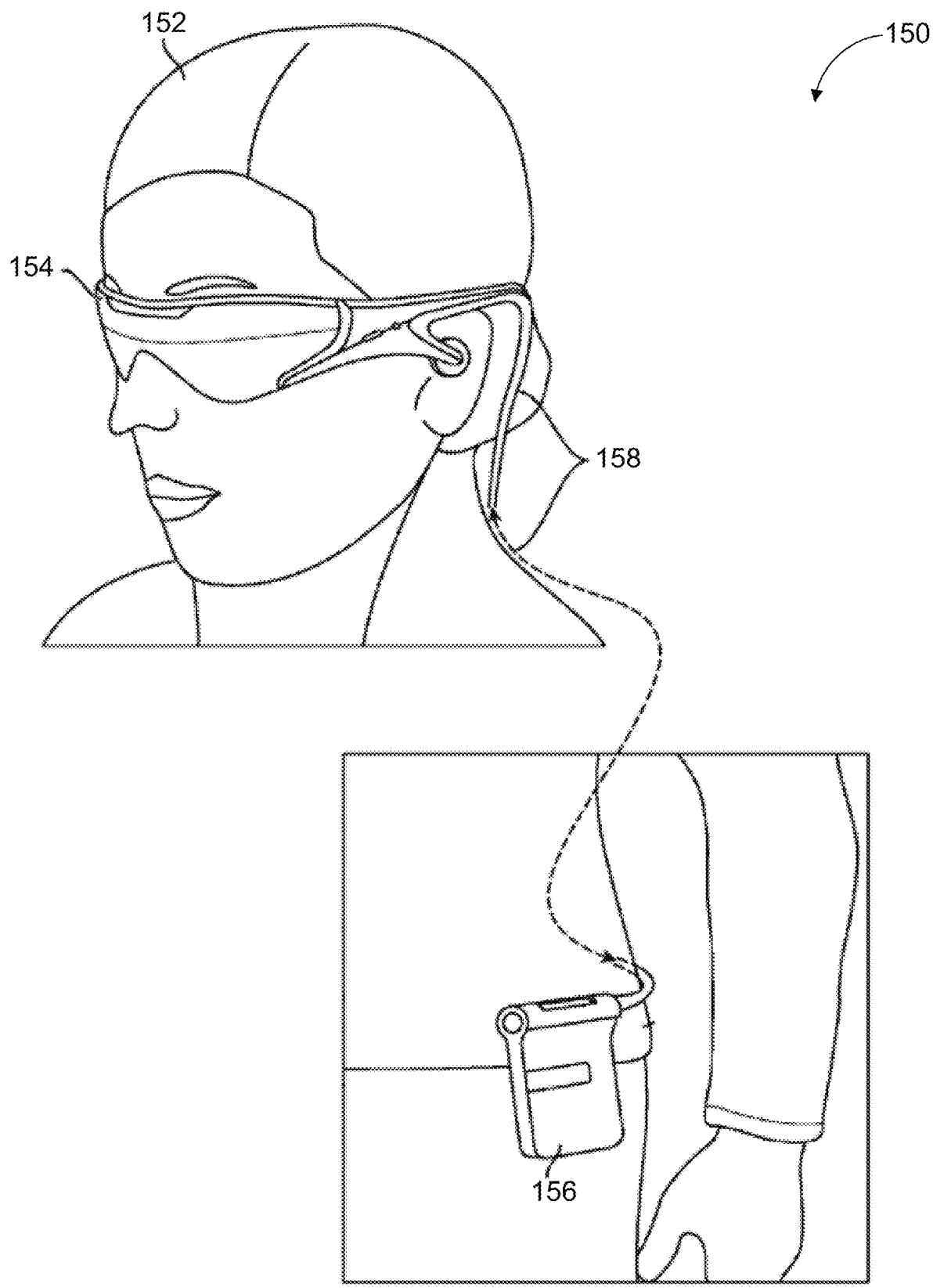
FIG. 1B shows an exemplary augmented reality system according to some embodiments.

FIG. 1B shows an exemplary augmented reality system 150 that may be operable to render virtual content (e.g., virtual objects, virtual tools, and other virtual constructs, for instance applications, features, characters, text, digits, and other symbols) in a field of view of a user 152, and may include a head-mounted wearable display device 154 and a computing device 156. The head-mounted wearable display device 154 may include a pair of augmented reality glasses 100 similar to that illustrated in FIG. 1A. The computing device 156 may include components (e.g., processing components, power components, memory, etc.) that perform a multitude of processing tasks to present the relevant virtual content to the user 152.

The computing device 156 may be operatively and/or communicatively coupled to the head-mounted wearable display device 154 by way of connection 158 (e.g., wired lead connection, wireless connection, etc.). The computing device 156 may be removably attached to the hip 203 of the user 152 in a belt-coupling style configuration. In other examples, the computing device 156 may be removably attached to another portion of the body of the user 152, attached to or located within a garment or other accessory (e.g., frame, hat or helmet, etc.) worn by the user 152, or positioned in another location within the environment of the user 152.

Figure 2:
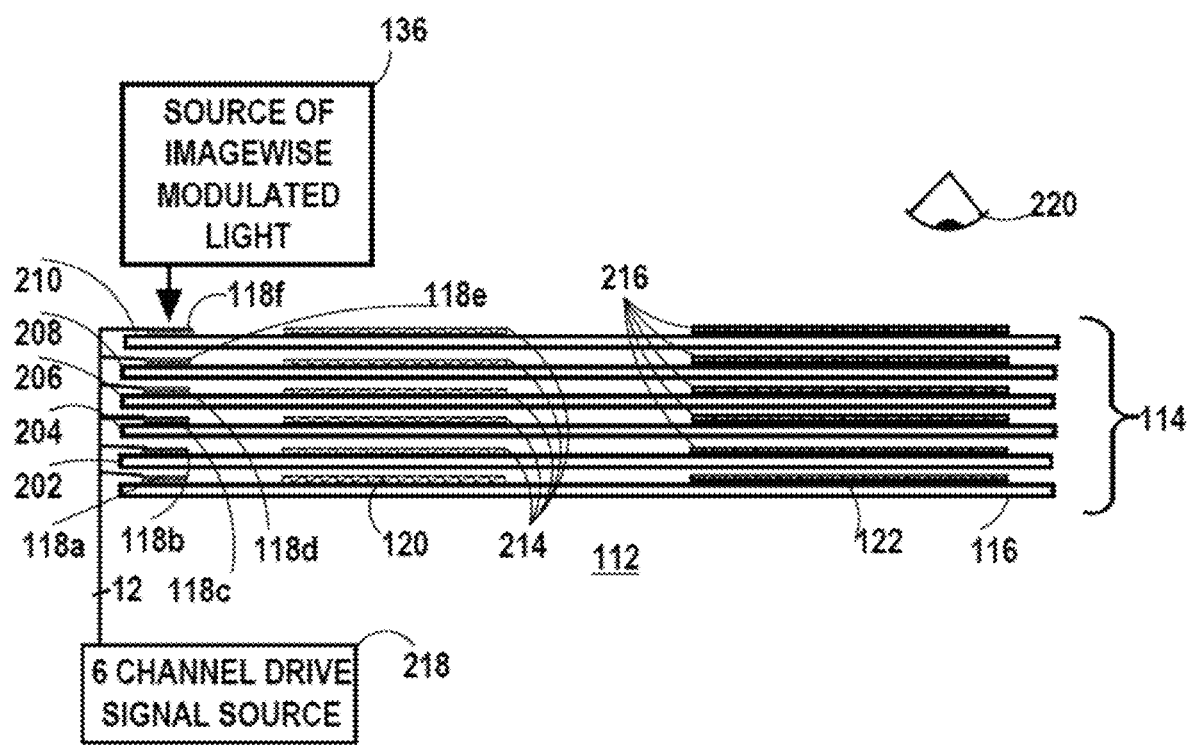
FIG. 2 is a schematic edge-on view of a portion of an eyepiece of the augmented reality glasses shown in FIG. 1, according to some embodiments.

FIG. 2 is a schematic edge-on view of the right eyepiece 112 illustrated in FIG. 1A. Note that the placement of the in-coupling grating 118, the orthogonal pupil expander 120 and the exit pupil expander 122 is altered in FIG. 2 relative to the placement shown in FIG. 1 for the purpose of illustration. Although not shown, the structure of the left eyepiece 110 is a mirror image of the structure of the right eyepiece 112. As illustrated in FIG. 2, in addition to the right front waveguide 116, the right stack of the plurality of waveguides 114 of the right eyepiece 112 includes a right second waveguide 202 disposed behind the right front waveguide 116, a right third waveguide 204 disposed behind the right second waveguide 202, a right fourth waveguide 206 disposed behind the right third waveguide 204, a right fifth waveguide 208 disposed behind the right fourth waveguide 206, and a right back waveguide 210 disposed behind the right fifth waveguide 208. Each of the second through fifth waveguides 202, 204, 206, 208 and back waveguide 210 has respectively a second through sixth incoupling grating 118b, 118c, 118d, 118e, 118f. The in-coupling gratings 118a, 118b, 118c, 118d, 118e, 118f can be designed, for example, to have a grating pitch and profile (e.g., blazed profile) to deflect imagewise modulated light that is incident perpendicularly to an angle above the critical angle for the waveguides 116, 202, 204, 206, 208. The second through fifth waveguides 202, 204, 206, 208 and back waveguide 210 also each include one of an additional set of orthogonal pupil expanders 214, and one of an additional set of exit pupil expanders 216.

The right-side source of imagewise modulated light 136 suitably outputs imagewise modulated light for different color channels and for different virtual object depths during separate time subframe periods. A particular sequence of color channels and depth planes can be repeated periodically at a video frame rate. The stack of six waveguides 114 can include two sets of three waveguides, wherein each of the two sets includes a red, a green and a blue color (RGB color) channel waveguide, and each of the two sets emits light with one of two virtual object distances which are determined by the field curvature of the emitted light. Light exiting from the front of the right eyepiece 110 is directed backward, passing to an eye position 220.

Figure 3:
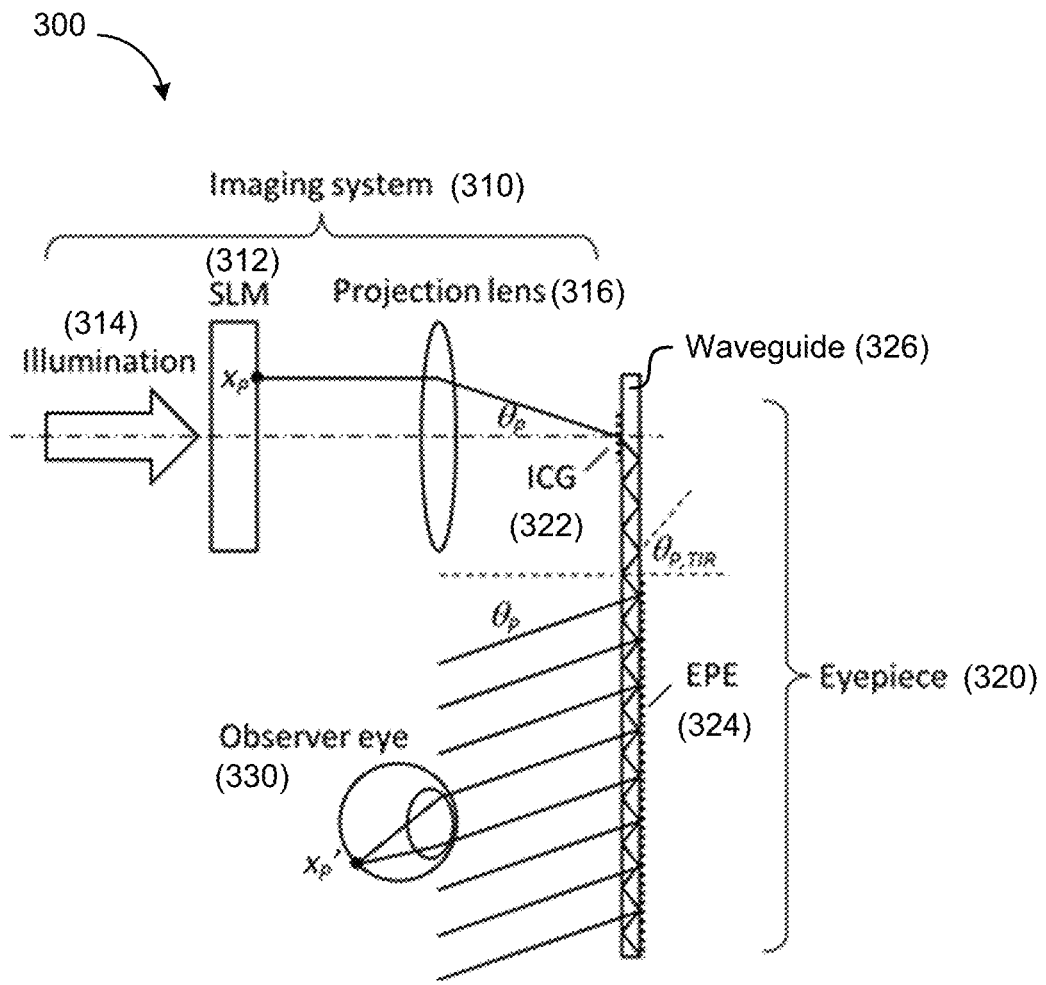
FIG. 3 shows an imaging system that may be used for projecting an image light field to an observer's eye through an eyepiece, according to some embodiments.

FIG. 3 shows an imaging system 310 that may be used for projecting an image light field to an observer's eye 330 through an eyepiece 320. The imaging system 310 may include a spatial-light-modulator (SLM) 312. The SLM 312 may include, for example, a liquid crystal on silicon (LCOS) display, a digital light processing (DLP) chip, or the like. An illumination source (not shown), such as light-emitting diodes (LEDs), lasers, and the like, may provide a (quasi) collimated light illumination 314 to be incident on the SLM 312. The SLM 312 may spatially modulate the illumination 314 to form a two-dimensional (2D) image of virtual content by controlling an amount of transmitted (or reflected) light incidence on each pixel. The imaging system 310 may further include a projection lens 316. The SLM 312 may be positioned at a back focal plane of the projection lens 316. Light transmitted by a respective pixel P at position $(x_P, y_P)$ may be transformed by the eyepiece 320.

The beam incident on an in-coupling grade (ICG) 322 of the eyepiece 320, which couples a portion of the incident light into a waveguide 326 as a total internal refraction (TIR) beam at a respective propagation direction $(\theta_{P,TIR}, \varphi_{P,TIR})$. Each TIR beam is replicated into multiple TIR beams in the waveguide 326, all with the same propagation direction. An exit pupil expander (EPE) 324 couples the TIR beams out of the eyepiece 320 as multiple output beams, all at the same propagation direction $(\theta_P, \varphi_P)$ toward the observer's eye 330. The beam replication allows the observer to view the image from an effectively larger exit pupil, hence the term exit pupil expander. A pupil of the observer's eye 330 collects a number of these beams, which will then be focused by the eye lens into a specific position on the retina $(x_{P'}, y_{P'})$. Thus, the light transmitted by a respective pixel P at a position $(x_P, y_P)$ may be transformed by the eyepiece 320 into a beam of parallel rays that propagates at a respective direction $(\theta_P, \varphi_P)$. For clarity, the second coordinate $y_P$ and the second angle $\varphi_P$ are suppressed in FIG. 3 and subsequent figures.

Various imaging systems, such as spatial-light-modulator (SLM) based projectors, microelectromechanical systems (MEMS) scanners, and fiber scanners, have been considered for providing imagewise modulated light in an augmented reality eyewear that includes an eyepiece, such as the eyepiece 320 illustrated in FIG. 3. Despite significant progress, it has become increasingly difficult to reduce the size of the projector. For example, a typical size of an SLM-based project may be about 15 mm, excluding the illumination module; a typical size of a fiber scanner may be about 10 mm, excluding the illumination module; and a typical size of a MEMS scanner may be about 10 mm, excluding the illumination module.

As described above, there may be a one-to-one correspondence between each pixel position $(x_P, y_P)$ on the SLM 312 (or other types of 2D scanner, such as a fiber scanner), a respective propagation direction $(\theta_P, \varphi_P)$ in free space, a respective TIR propagation direction $(\theta_{P,TIR}, \varphi_{P,TIR})$ inside the waveguide 326, and a respective image position $(x_{P'}, y_{P'})$ at the retina of the observer's eye 330. According to some embodiments of the present disclosure, the TIR propagation direction $(\theta_{P,TIR}, \varphi_{P,TIR})$ may be generated directly in an eyepiece and may be scanned for all points in the image field. This new imaging paradigm may eliminate the need for the external imaging system 310, and therefore may enable the construction of a very compact eyewear.

Figure 4:
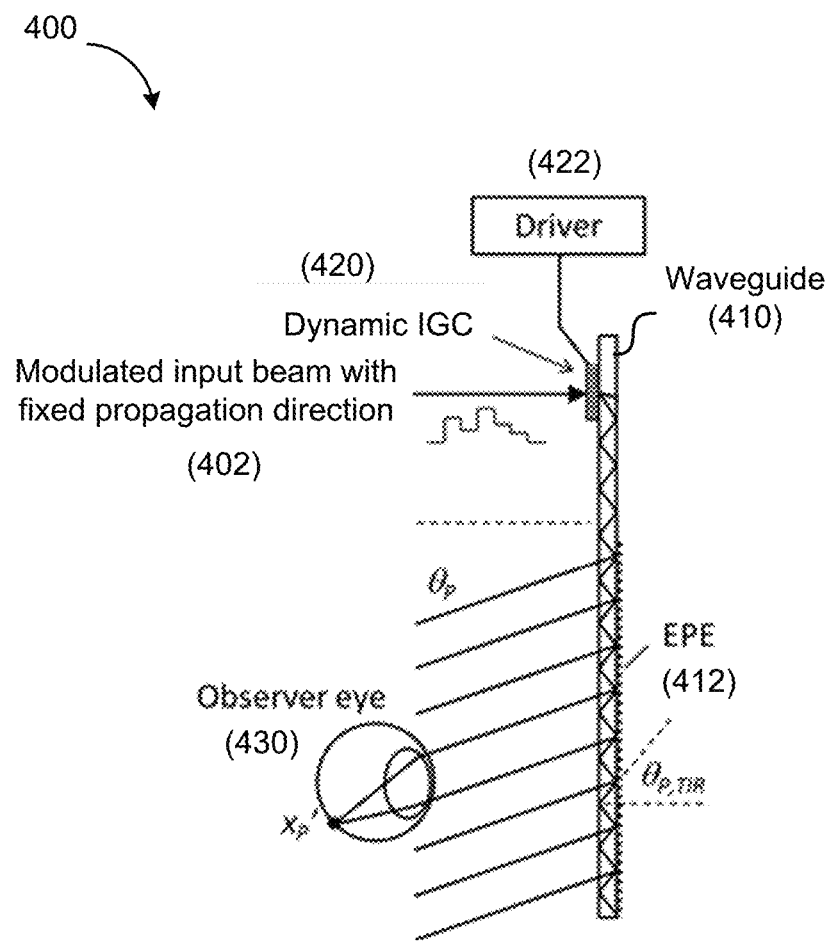
FIG. 4 illustrates schematically an eyepiece that includes a dynamic incoupling grating (ICG), according to some embodiments.

FIG. 4 illustrates schematically an eyepiece 400, according to some embodiments. The eyepiece 400 includes a waveguide 410, a two-dimensional (2D) dynamic ICG 420 coupled to a first lateral region of the waveguide 410, and a diffractive optical element (DOE) 412 (such as an orthogonal pupil expander OPE, and/or exit pupil expander EPE) coupled to a second lateral region of the waveguide 410. An input light beam 402 with a fixed propagation direction (e.g., normal to the waveguide 410, (=0) is incident on the dynamic ICG 420. The input light beam 402 may be intensity modulated in one or more time slots such that, for each time slot, the intensity of the input light beam 402 corresponds to the relative brightness of a respective image point P in an image field (the image point P may be analogous to a pixel $(x_P, y_P)$ on the SLM 312 illustrated in FIG. 3).

Figure 5:
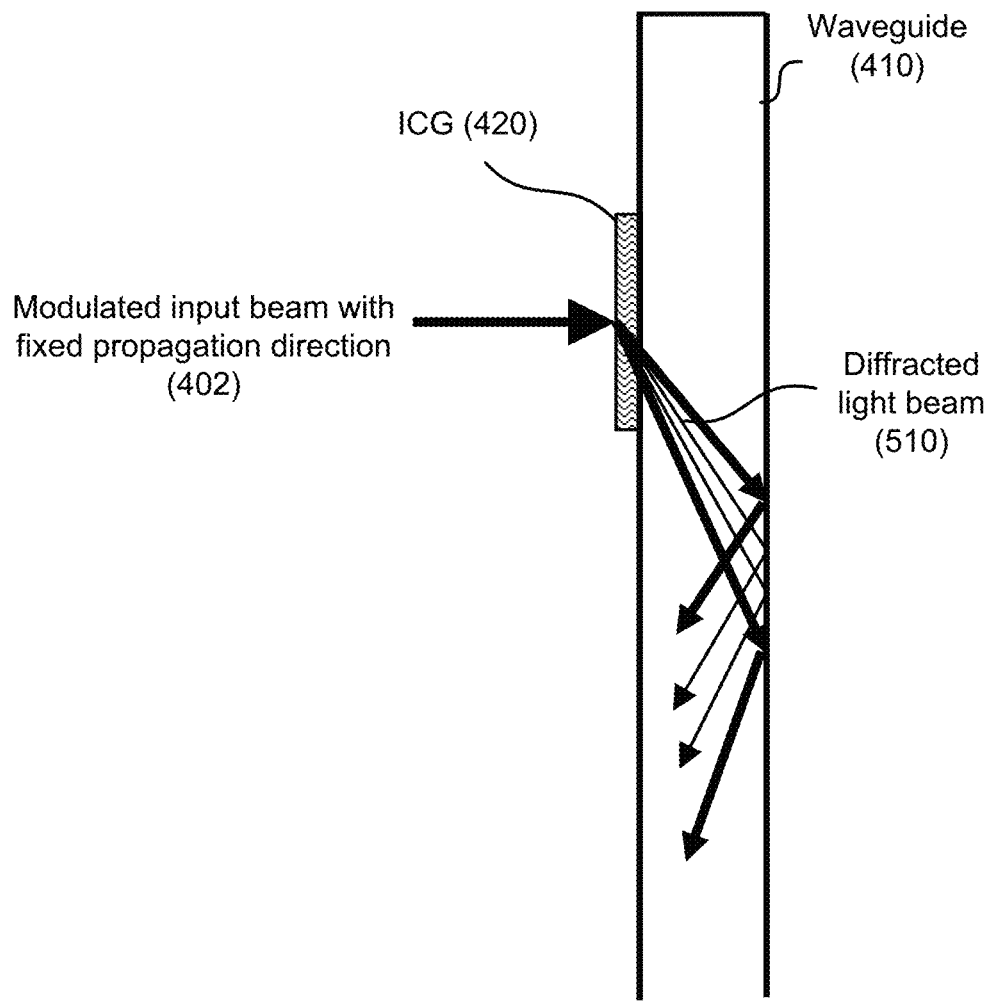
FIG. 5 illustrates schematically the function of the dynamic ICG shown in FIG. 4, according to some embodiments.

FIG. 5 illustrates schematically the action of the dynamic ICG 420, according to some embodiments. The dynamic ICG 420 is configured to diffractively couple the input light beam 402 into the waveguide 410 as a TIR beam. As illustrated in FIG. 5, a TIR angle of a diffracted light beam 510 may be dynamically varied from one time slot to another time slot synchronously with the modulation of input light beam 402, such that the TIR angle $(\theta_{TIR}, \varphi_{TIR})$ for each time slot corresponds to the respective image field P. Thus, by scanning the TIR angle $(\theta_{TIR}, \varphi_{TIR})$ in a range of TIR angles in the one or more slots, the entire image field may be scanned.

Referring again to FIG. 4, for a respective TIR angle $(\theta_{TIR}, \varphi_{TIR})$ in a respective time slot, the EPE 412 couples the TIR beams out of the eyepiece 400 at a corresponding propagation directions $(\theta_P, \varphi_P)$ toward the observer's eye 430. The pupil of the observer's eye 430 collects the output beams, which are then focused by the eye lens into a specific position on the retina $(x_{P'}, y_{P'})$. As the TIR angle $(\theta_{TIR}, \varphi_{TIR})$ is scanned by the dynamic ICG 420 in the range of TIR angles in the one or more time slots, the propagation direction $(\theta_P, \varphi_P)$ of the output beams is scanned correspondingly, thereby covering the entire image field. (Note, for clarity, only one propagation direction $(\theta_P, \varphi_P)$ is shown in FIG. 4.)

Therefore, as described above, the dynamic ICG 420 integrates the function of an ICG with the function of a scanner in a single device, thereby eliminating the need for a separate imaging system 310 as illustrated in FIG. 3. As such, the eyewear may be made with significantly reduced size and weight as compared to a conventional eyewear. In some embodiments, the dynamic ICG 420 may have no moving parts, unlike a fiber scanner or a MEMS scanner, for example. An eyepiece incorporating a dynamic ICG 420 may afford other advantages. For example, higher brightness and lower power consumption may be realized, as there are less optical components that can cause additional loss.

In some embodiments, simultaneous color may be used. In these embodiments, red (R), green (G), and blue (B) information may be simultaneously present as colinear R, G, B beams from R, G, B lasers, respectively. As the three colinear R, G, B beams are scanned across an image field, an amount of each color at any point (pixel) may be controlled by modulating independently, but simultaneously, the three lasers. In contrast, sequential color may be used if a single LCOS is shared to generate R, G, B images, one color at a time.

Figure 6A:
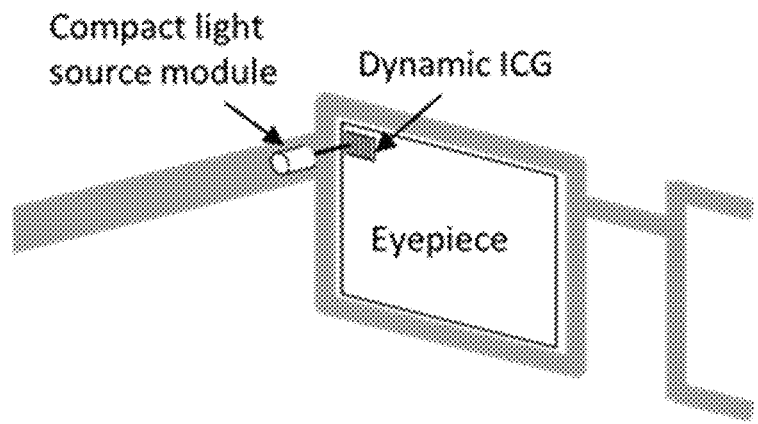
FIG. 6A illustrates schematically a compact eyewear, according to some embodiments.

FIG. 6A illustrates schematically a compact eyewear, according to some embodiments. The compact eyewear may include an eyepiece (e.g., similar to the eyepiece 400) that includes a dynamic ICG (e.g., similar to the dynamic ICG 420). A compact light source module mounted on the eyewear may provide an input light beam incident on the dynamic ICG at a fixed propagation direction. In some embodiments, the compact light source module may emit collimated light. In some embodiments, the compact light source module may emit light that has a narrow spectrum/beam spread. In some embodiments, the compact light source module may include one or more lasers. For example, the compact light source module may include a red laser, a blue laser, and a green laser. In some embodiments, the compact light source module may be in a head-mounted wearable display device (e.g., similar to the head-mounted wearable display device 154 illustrated in FIG. 1B). In some embodiments, the compact light source module may include one or more LEDs. For example, the one or more LEDs may be one or more superluminescent LEDs (SLEDs). In some embodiments, a controller may be used to operate the compact light source module, for example move the compact light source module and/or to modulate the compact light source module. The controller may be used to load an image into one or more light beams.

Figure 6B:
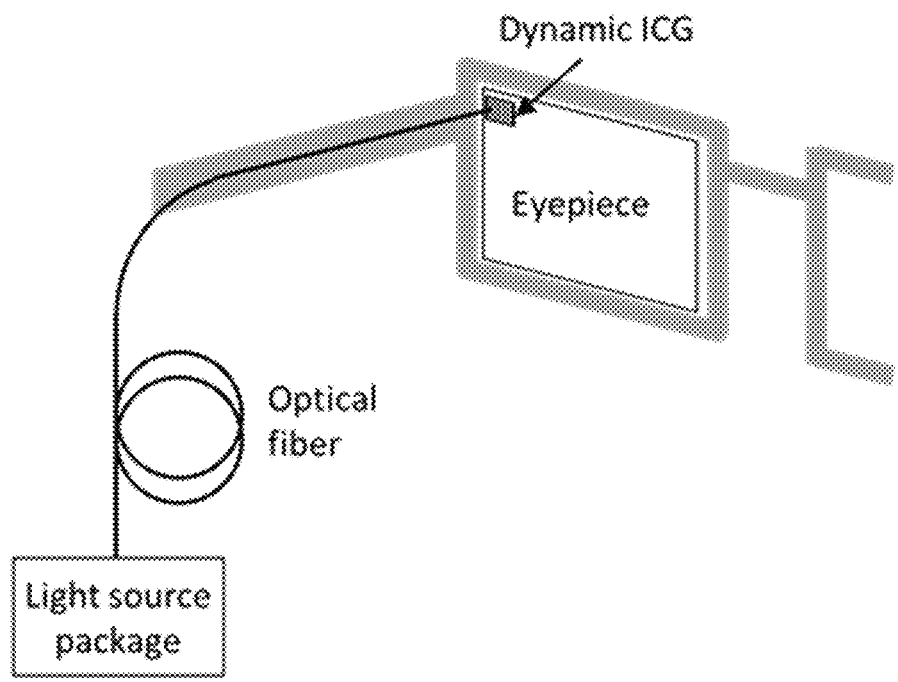
FIG. 6B illustrates schematically a compact eyewear, according to some embodiments.

FIG. 6B illustrates schematically a compact eyewear, according to some embodiments. Here, a separate light source package may provide an input light beam via an optical fiber. In some embodiments, the compact light source module may be in a beltpack (e.g., in the computing device 156 illustrated in FIG. 1B) and may be delivered to a head-mounted wearable display device via a fiber. Since the operation of the dynamic ICG may be polarization independent, the input light beam can be unpolarized. Therefore, efficient fiber transport may be realized by using a non-polarization-maintaining optical fiber.

Figure 7A:
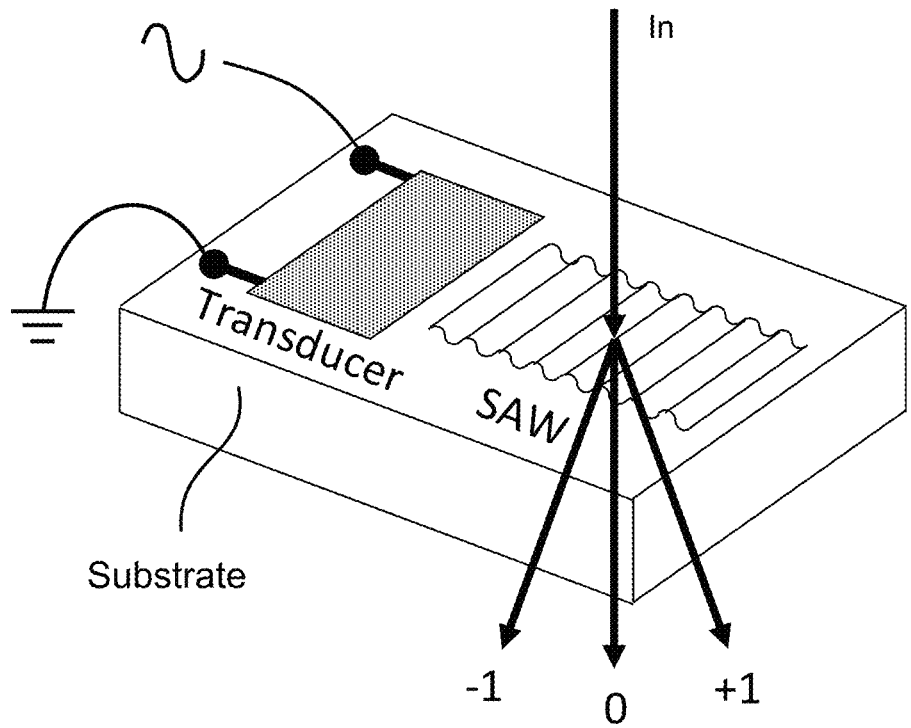
FIG. 7A illustrates schematically a one-dimensional (1D) dynamic ICG based on a surface acoustic wave (SAW) modulator, according to some embodiments.

FIG. 7A illustrates schematically a one-dimensional dynamic ICG based on a surface acoustic wave (SAW) modulator, according to some embodiments. A SAW modulator uses an acousto-optic effect to diffract light using sound waves (for example, at radio-frequency). A transducer (e.g., a piezoelectric transducer) is attached to a substrate of the SAW modulator. An oscillating electric signal may drive the transducer to vibrate, which may create an acoustic wave that propagates on the surface of the substrate. This acoustic wave (which may be referred to as a surface acoustic wave, or SAW) may cause deformation of the surface and form a diffraction grating. The substrate may include a material that exhibits the piezoelectric effect, such as fused silica, lithium niobate, lithium tantalate, lanthanum gallium silicate, arsenic trisulfide, tellurium dioxide, tellurite glass, lead silicate, or the like. The substrate can include a material that exhibits the piezoelectric effect as originally fabricated, or a material that exhibits the piezoelectric effect can be deposited onto the substrate. For each pixel, a certain diffraction grating in 2D is created having a particular grating pitch that will diffract light in a particular direction. Changing the diffraction grating by changing the grating pitch will result in a change in the direction.

A beam of light ("In") incident on the diffraction grating formed by the SAW may be diffracted, either in a transmission geometry or a reflection geometry (e.g., on a metallized surface). FIG. 7A illustrates a SAW modulator in a transmission geometry. As illustrated, various diffraction orders (e.g., −1, 0, +1 orders) may result. The period of the diffraction grating may depend on the frequency of the driving electric signal. Diffraction angles (e.g., in the first order diffraction) depend on the period of the diffraction grating. Therefore, by modulating the frequency of the driving electric signal, the diffracted light may scan a range of angles.

Figure 7B:
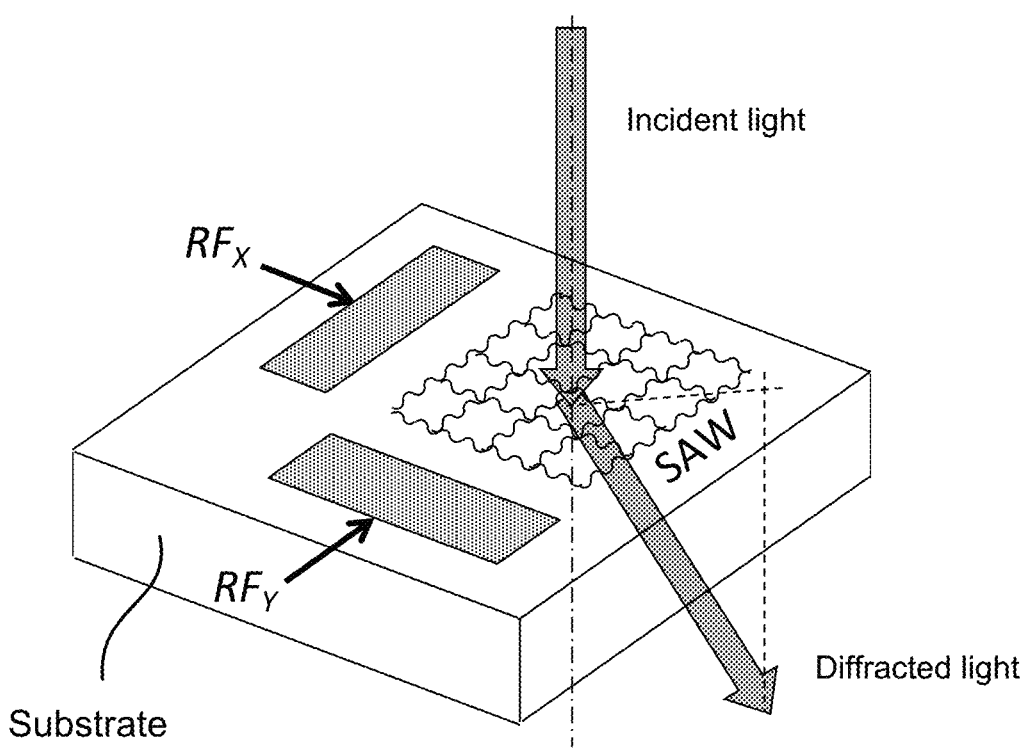
FIG. 7B illustrates schematically a two-dimensional (2D) dynamic ICG based on a SAW modulator, according to some embodiments.

The SAW modulator described above may be extended to a two-dimensional (2D) case. FIG. 7B illustrates schematically a 2D SAW modulator in a transmission geometry, according to some embodiments. A first transducer for the X-axis motion and a second transducer for the Y-axis motion are attached to a substrate. A first oscillating electric signal RF $(RF)_x$ may drive the first transducer to vibrate along the X-axis, and a second oscillating electric signal RF $(RF)_y$ may drive the second transducer to vibrate along the Y-axis, together which may create a 2D SAW that propagates on the surface of the substrate. The 2D SAW may cause deformation of the surface of the substrate and form a 2D diffraction grating. An incident light beam may be diffracted by the diffraction grating (for clarity, only the main diffraction order, for example, a first order, is shown in FIG. 7B). By scanning the frequencies of the driving electric signals $(RF)_x$ and $(RF)_y$ along the X-axis and the Y-axis, respectively, the diffracted light may scan a range of 2D angles $(\theta, \varphi)$, for example in an x-y pattern (raster scan), or in a spiraling pattern.

In some embodiments, multiple driving frequencies may be superimposed on each other. For example, one or more electric signals may be combined as a composite driving signal along the X-axis, where each respective electric signal corresponds a respective frequency. In this manner, a group of pixels (or an entire line of pixels) along the X-axis may be simultaneously addressed. In some embodiments, the acoustic wave may be modulated by a superposition of RF signals. In some embodiments, two gratings may be superimposed and light may be diffracted according to the diffraction characteristics (e.g., pitch and/or amplitude) of each of the two gratings. For example, if there is a first grating and a second grating and the first grating and the second grating are superimposed, then light incident thereon will be diffracted and split in directions determined by both a first pitch of the first grating and a second pitch of the second grating, and have amplitudes related to a first amplitude of the first grating and a second amplitude of the second grating. A frequency of a first RF signal may determine the first pitch of the first grating and an amplitude the first RF signal may determine an amplitude of the first grating. Similarly, a frequency of a second RF signal may determine the second pitch of the second grating and an amplitude of the second RF signal may determine an amplitude of the second grating. In some embodiments, multiple gratings may be superimposed and light diffracted off the multiple gratings may follow all the multiple gratings.

It may be noted that the grating amplitude may depend on the electric power delivered to the one or more transducer. Therefore, in some embodiments, image intensity modulation may also be performed by the SAW modulator by modulating the electric power of the driving electric signal, in addition to modulating the frequency of the driving electric signal.

It may also be noted that the constantly changing diffraction gratings as a result of the frequency/amplitude modulation may help reduce coherent artifacts that a static grating may produce. For example, coherent artifacts produced by a static grating may manifest as a light-dark variations across an image field. The constantly changing diffraction gratings may produce "sliding" light-dark variations that may be less noticeable as the eye integrates the light in a response time window.

In some embodiments, the SAW modulator may be formed on a surface of a waveguide, as illustrated in FIG. 5. For example, a layer of piezoelectric material, such as lithium niobate, and one or more transducers may be attached to the surface of the waveguide. In some embodiments, the SAW modulator may be formed below the surface of the waveguide. For example, a layer of piezoelectric material may be embedded in the waveguide, and one or more transducers may be coupled to the layer of piezoelectric material. In some embodiments, the SAW modulator may be an integral part of the waveguide. For example, the waveguide may include a piezoelectric material, such as lithium niobate. One or more transducers may be formed on a first lateral region of the surface of the waveguide for generating SAWs in the first lateral region of the surface.

It should be understood that, although a SAW modulator is discussed above as an example of a dynamic ICG, other types of analog scanning technologies may also be used for the dynamic ICG.

Figure 8A:
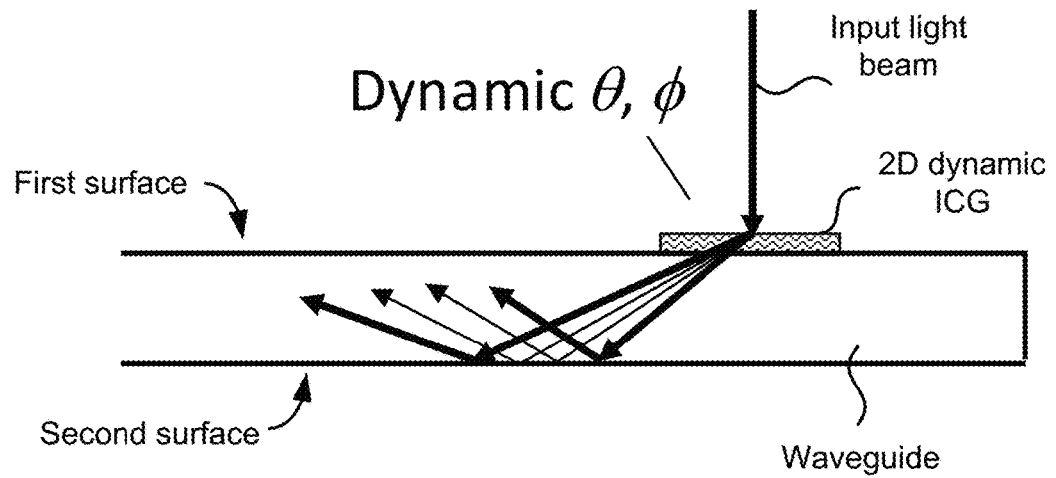
FIG. 8A illustrates schematically a 2D dynamic ICG in an eyepiece in a transmission geometry, according to some embodiments.

FIG. 8A illustrates schematically a 2D dynamic ICG in an eyepiece in a transmission geometry, according to some embodiments. The eyepiece includes a waveguide that has a first surface and a second surface opposite the first surface. The 2D dynamic ICG is coupled to the first surface of the waveguide. Note that this configuration is similar to that illustrated in FIGS. 4 and 5. An intensity-modulated input light beam is normally incident on the 2D dynamic ICG. As described above with reference to FIG. 5, the 2D dynamic ICG is modulated synchronously with the intensity modulation of the input light beam, such that one or more corresponding diffracted light beams in the transmission geometry with a range of propagation angles $(\theta, \varphi)$ are propagated in the waveguide. Each propagation angle $(\theta, \varphi)$ corresponds to a respective image field P. It should be understood that, although the 2D dynamic ICG is illustrated as positioned above the first surface of the waveguide, this is not required. In some embodiments, the 2D dynamic ICG may be imbedded in the waveguide or may be an integral part of the waveguide.

Figure 8B:
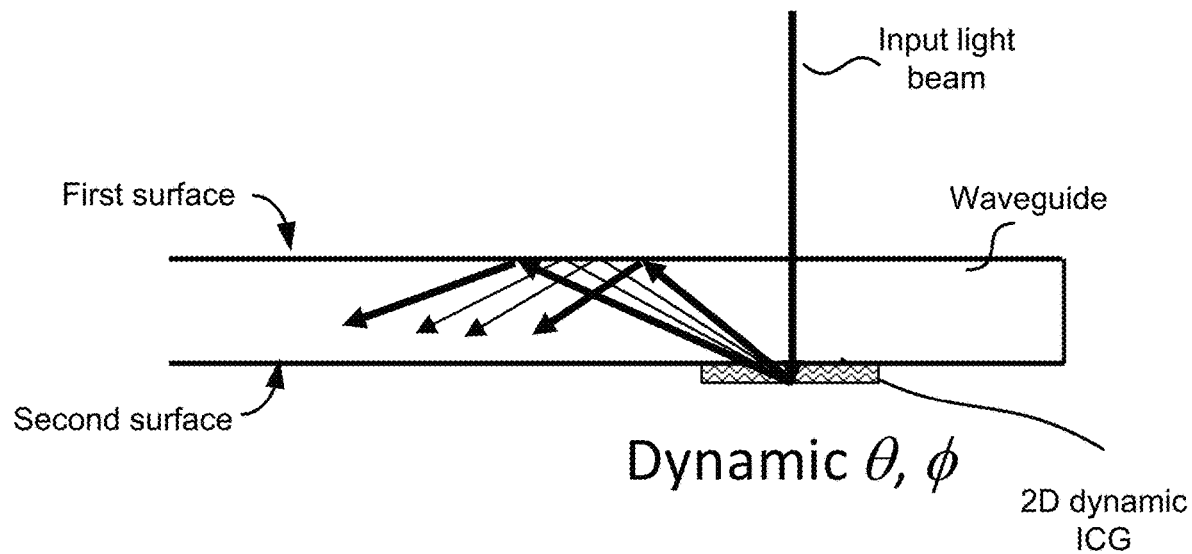
FIG. 8B illustrates schematically a 2D dynamic ICG in an eyepiece in a reflection geometry, according to some embodiments.

FIG. 8B illustrates schematically a 2D dynamic ICG in an eyepiece in a reflection geometry, according to some embodiments. The eyepiece includes a waveguide that has a first surface and a second surface opposite the first surface. The 2D dynamic ICG is coupled the second surface of the waveguide. An intensity-modulated input light beam passes through the waveguide and is normally incident on the 2D dynamic ICG. The 2D dynamic ICG is modulated synchronously with the intensity modulation of the input light beam, such that one or more corresponding diffracted light beams in the reflection geometry with a range of propagation angles (θ, φ) are propagated in the waveguide. Each propagation angle (θ, φ) corresponds to a respective image field P. It should be understood that, although the 2D dynamic ICG is illustrated as positioned below the second surface of the waveguide, this is not required. In some embodiments, the 2D dynamic ICG may be imbedded in the waveguide or may be an integral part of the waveguide.

Figure 9:
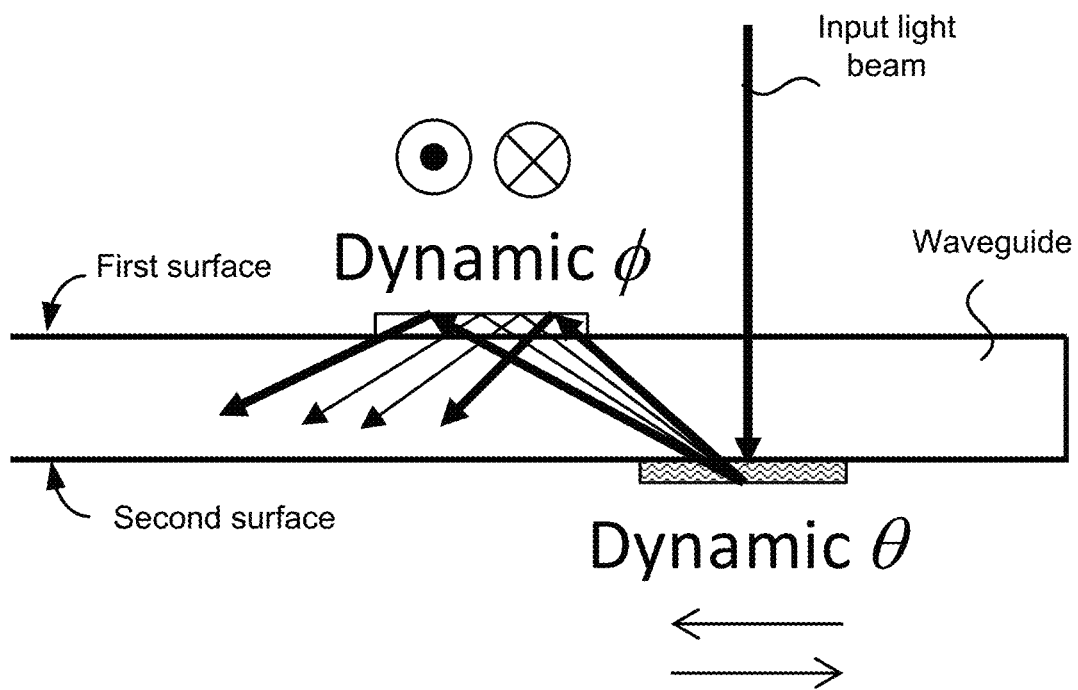
FIG. 9 illustrates schematically an eyepiece that includes two 1D dynamic ICGs cascaded with respect to each other, according to some embodiments.

FIG. 9 illustrates schematically an eyepiece that includes two one-dimensional (1D) dynamic ICGs cascaded with respect to each other, according to some embodiments. The eyepiece includes a waveguide that has a first surface and a second surface opposite the first surface. A first 1D dynamic ICG is coupled to the second surface of the waveguide. A second 1D dynamic ICG is coupled to the first surface of the waveguide. An intensity-modulated input light beam passes through the waveguide and is normally incident on the first 1D dynamic ICG.

The first 1D dynamic ICG is modulated synchronously with the intensity modulation of the input light beam, such that one or more corresponding diffracted light beams in the reflection geometry with a range of propagation angles θ are propagated in the waveguide. The left and right arrows under the first 1D dynamic ICG illustrated in FIG. 9 indicate that input light beams are dispersed into one or more propagation angles θ in the plane of the paper.

The light beams diffracted by the first 1D dynamic ICG with a range of propagation angles θ are incident on the second 1D dynamic ICG. The second 1D dynamic ICG is modulated synchronously with the intensity modulation of the input light beam, such that one or more corresponding diffracted light beams in the reflection geometry with a range of propagation angles φ are propagated in the waveguide. The dot and the cross above the second 1D dynamic ICG illustrated in FIG. 9 indicate that the light beams are dispersed into one or more propagation angles φ in the plane perpendicular to the paper. In some embodiments, because the input light beam is diffracted twice (by the first 1D dynamic ICG followed by the second 1D dynamic ICG), the coupling efficiency may not be as high as in the cases with a single 2D dynamic ICG as illustrated in FIGS. 8A and 8B (the effective diffraction efficiency may be approximately $\eta^2$, where $\eta$ is the diffraction efficiency of a single ICG).

Figure 10A:
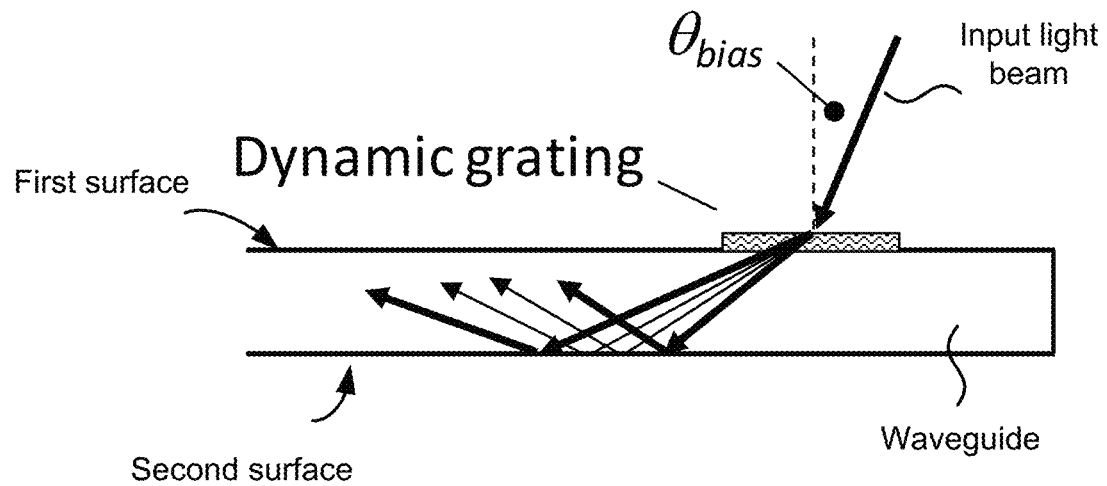
FIG. 10A illustrates schematically an eyepiece where the input light beam is incident on a dynamic ICG at a bias angle $\theta_{bias}$ with respect to normal incidence, according to some embodiments.

In some cases, it may be desirable to have the input light beam incident on the dynamic ICG at a bias angle $\theta_{bias}$. FIG. 10A illustrates schematically an eyepiece where the input light beam is incident on a dynamic ICG at a bias angle $\theta_{bias}$ with respect to a normal of the surface of the dynamic ICG, according to some embodiments. Diffracted light beams in a range of dynamically modulated angles (θ, φ) in the transmission mode are propagated in the waveguide. The angular bias can be done in any direction, either in θ or φ, or a combination thereof (although only shown for θ in FIG. 10A for purposes of clarity).

A bias angle $\theta_{bias}$ may be desirable in some cases in order to facilitate propagation in the waveguide via total internal reflection (TIR). For example, depending on the possible grating vectors that can be generated by the dynamic ICG, the range of propagation angles (θ, φ) of the diffracted light beams generated from a normal incident input light beam may not meet the TIR condition of the waveguide. In such cases, a bias angle $\theta_{bias}$ of the input light beam may provide an extra "kick" needed for making the range of propagation angles (θ, φ) meet the TIR condition of the waveguide (as discussed in further detail below with reference to FIG. 17).

Figure 10B:
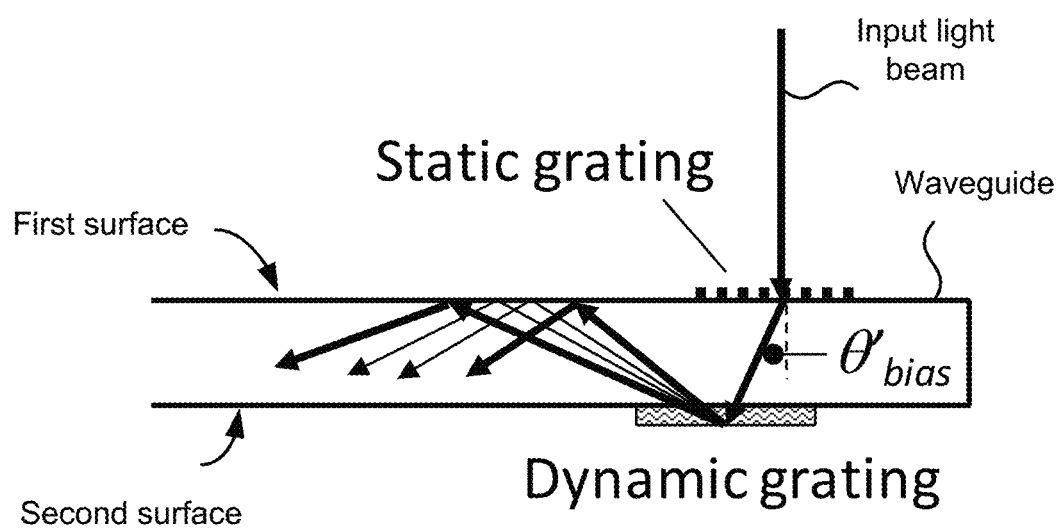
FIG. 10B illustrates schematically an eyepiece that includes a static diffraction grating to create a bias angle $\theta'_{bias}$ for an input light beam incident on a dynamic ICG, according to some embodiments.

FIG. 10B illustrates schematically an eyepiece that includes a static diffraction grating coupled to the first surface of a waveguide. The input light beam is normally incident on the static diffraction grating, and is diffracted by the static diffraction grating at a bias angle $\theta'_{bias}$. The diffracted light beam is then incident on the dynamic ICG at the bias angle $\theta'_{bias}$, and is diffracted by the dynamic ICG into a range of dynamically modulated angles (θ, φ) in the reflection mode. In this embodiments, because the input light beam is diffracted twice (by the static diffraction grating followed by the dynamic ICG), the coupling efficiency may not be as high as the case illustrated in FIG. 10A.

Figure 11:
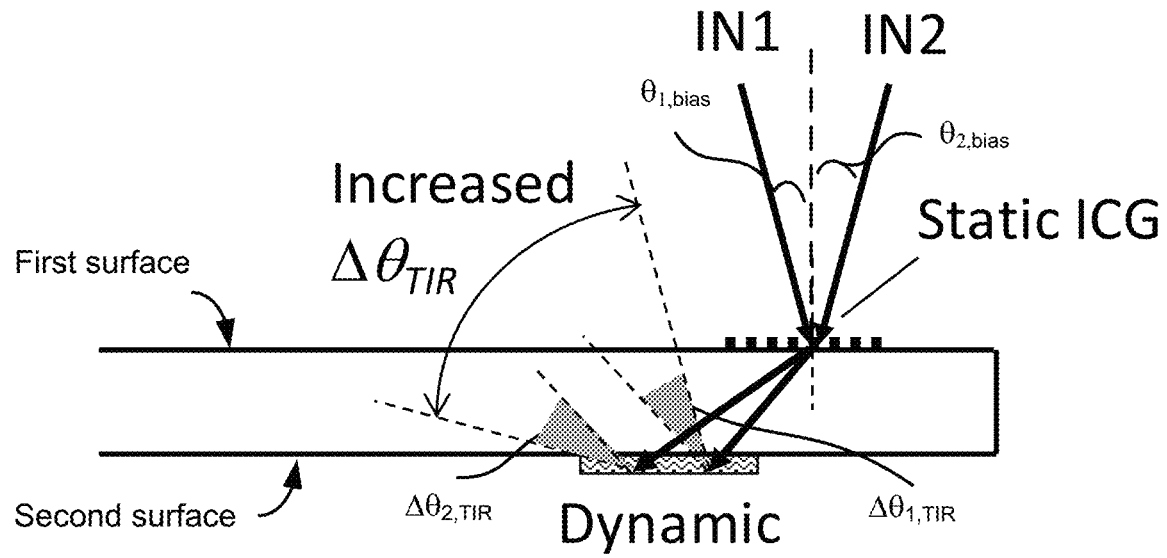
FIG. 11 illustrates schematically a configuration where two input light beams are used to increase the total field of view (FOV), according to some embodiments.

In some cases, the modulation range of a dynamic ICG may not be large enough to cover a full field of view (FOV). In some embodiments, multiple input light beams may be used to increase the image field of view. FIG. 11 illustrates schematically a configuration where two input light beams ("IN1" and "IN2") are used. The eyepiece may include a static ICG coupled to a first surface of a waveguide, and a dynamic ICG coupled to a second surface of the waveguide. A first input light beam "IN1" is incident on the static ICG at a first bias angle $\theta_{1,bias}$, and is diffracted by the static ICG at a first diffraction angle. The first input light beam "IN1" diffracted by the static ICG is subsequently diffracted by the dynamic ICG into a first range of dynamically modulated total internal reflection (TIR) angles $\Delta\theta_{1,TIR}$. A second input light beam "IN2" is incident on the static ICG at a second bias angle $\theta_{2,bias}$, and is diffracted by the static ICG at a second diffraction angle. The second input light beam "IN2" diffracted by the static ICG is subsequently diffracted by the dynamic ICG into a second range of dynamically modulated TIR angles $\Delta\theta_{2,TIR}$. The total range of TIR angles $\Delta\theta_{TIR}$ may be the sum of the first range of dynamically modulated TIR angles $\Delta\theta_{1,TIR}$ and the second range of dynamically modulated TIR angles $\Delta\theta_{2,TIR}$. Therefore, a larger field of view compared to the case of a single input light beam may be achieved. For example, the first TIR angles $\theta_{1,TIR}$ may range from 40° to 55° (i.e., $\Delta\theta_{1,TIR}=15°$), and the second TIR angles $\theta_{2,TIR}$ may range from 55° to 70° (i.e., $\Delta\theta_{2,TIR}=15°$). Thus, the total range of TIR angles $\Delta\theta_{TIR}$ may be 30°.

It should be appreciated that two or more of the configurations illustrated in FIGS. 8A-8B, 9, 10A-10B, and 11 may be combined, according to some embodiments.

In some embodiments, full RGB colors may be implemented using a stack of three waveguides (e.g., as illustrated in FIG. 2), each waveguide configured for one of the RGB colors. The colors may be separated using a split pupil configuration or an in-line configuration, as described in U.S. Pat. No. 10,371,896, the content of which is incorporated herein by reference.

Assuming a speed of a SAW is $v_s$ and a RF driving frequency is f, the SAW grating period $\Lambda_s$ may then be expressed as, $$\Lambda_s = v_s/f. \tag{1}$$

Figure 12:
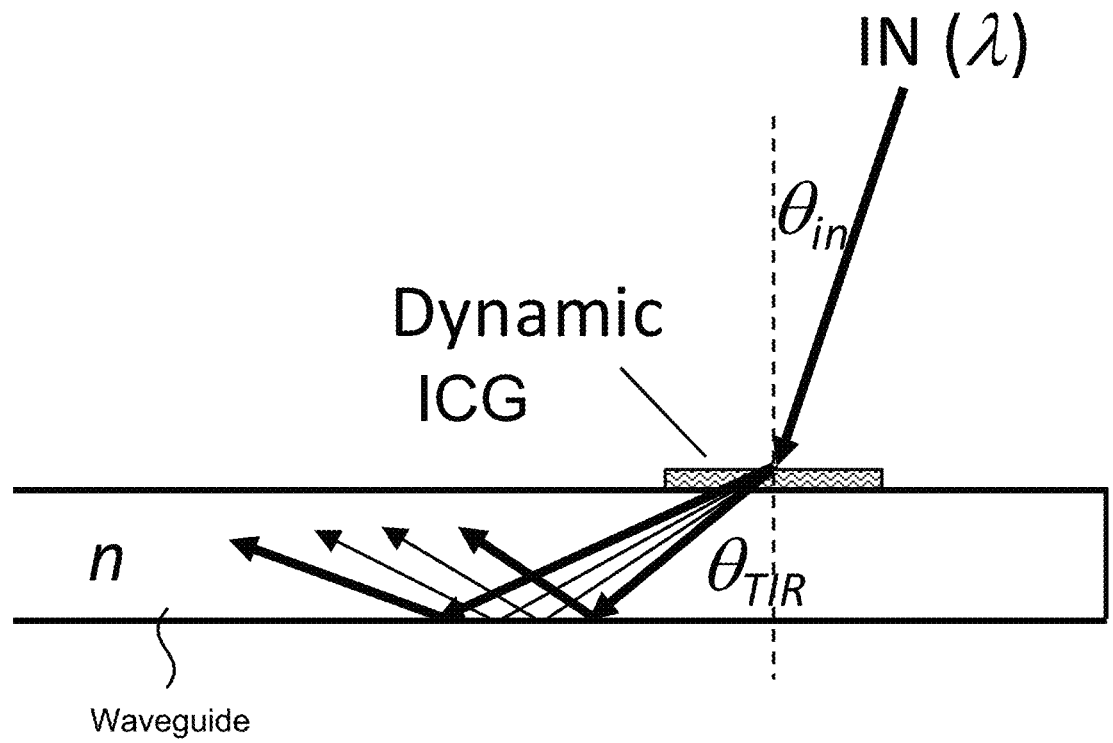
FIG. 12 illustrates schematically an eyepiece with a 1D dynamic ICG in a transmission geometry, according to some embodiments.
Figure 13:
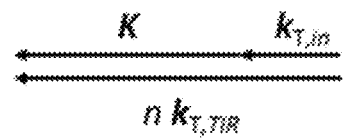
FIG. 13 shows a k-vector diagram for first-order diffraction of the 1D dynamic ICG illustrated in FIG. 12, according to some embodiments.

Consider a 1D transmission dynamic ICG with input angle of incidence $\theta_{in}$, as illustrated in FIG. 12. Assume that the RF frequencies supported by the modulator ranges from $f_{min}$ to $f_{max}$. Assume further that first-order diffraction propagates via TIR inside the waveguide (with index of refraction $n_g$) over the operational RF frequency range (otherwise an angular bias may be used, as discussed below with reference to FIG. 17). FIG. 13 shows the k-vector diagram for the first-order diffraction based on transverse momentum conservation. The k-vector diagram may be represented by the following equation:

$$n\, k_{T,TIR} = k_{T,in} + K, \tag{2}$$

where K is the dynamic grating vector with magnitude $2\pi/\Lambda_s$. From Eq. (2), the Bragg-Snell equation follows:

$$n \sin \theta_{TIR} - \sin \theta_{in} = \lambda/\Lambda_s \quad (3)$$

As a numerical example, assume $\theta_{in}=0°$ (normal incidence), $\Lambda=530$ nm, n=1.8, $v_s=600$ m/s, $f_{min}=1.2$ GHZ, and $f_{max}=2.0$ GHz. Using Eq. (3), one may find that $\theta_{TIR}(f_{min})=36.1°$ (above 34.4° critical angle) and $\theta_{TIR}(f_{max})=79.0°$. Using a 0.375 µm pitch EPE, the TIR beams can be coupled out to span an angular field of view (FOV) of $\Delta\theta=41.4°$ (i.e., ±20.7°).

Assuming a length of the dynamic grating to be D, using a Fourier transform lens with a focal length of F, a spot size at a transform plane may be expressed as $d=2F\lambda/D$. With a FOV of $\otimes($, an image size would be $2F \tan(\otimes(2)$. Therefore, the number of resolution spots across a scanned image may be expressed as, $$N = \frac{D\tan\left(\frac{\Delta\theta}{2}\right)}{\lambda} \quad (4)$$

Assuming the length of the dynamic grating D=2 mm, using $\otimes(=41.4°$ and $\angle=530$ nm from Example 1, the number of resolution spots may be 1426 (which corresponds to 1.74 arcmin angular resolution).

A minimum pixel time may be the time the SAW goes across the grating length D. A more conservative value for the pixel time $T_{pixel}$ that accounts for the transient may be assumed to be about three times this ratio, $$T_{pixel} = \frac{3D}{v_s} \quad (5)$$

For $v_s=600$ m/s and D=2 mm, according to Eq. (5), the pixel time would be $T_{pixel}=10$ µs.

Figure 14:
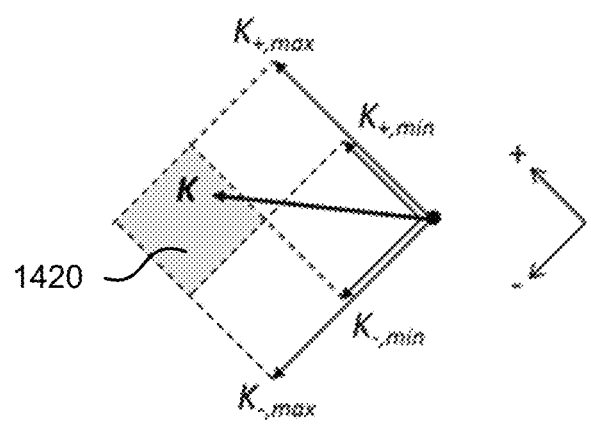
FIG. 14 shows a k-vector diagram of a 2D dynamic ICG for a normal incident input beam, according to some embodiments.

FIG. 14 shows a k-vector diagram of a 2D dynamic ICG for a normal incident input beam. For the purpose of illustration, a 2D dynamic ICG with two orthogonal eigenmodes propagating in the + and − directions is considered. Shaded region 1420 in the k-space represents all grating vectors K with magnitude $2\pi/\Lambda$s that can be generated by the 2D dynamic ICG. The shaded region 1420 may be referred herein as the dynamic grating region. The subscripts "min" and "max" correspond to the minimum and maximum RF frequencies, respectively. In some embodiments, broadband transducers may be used to achieve a larger dynamic grating region 1420, thus a wider FOV.

Figure 15:
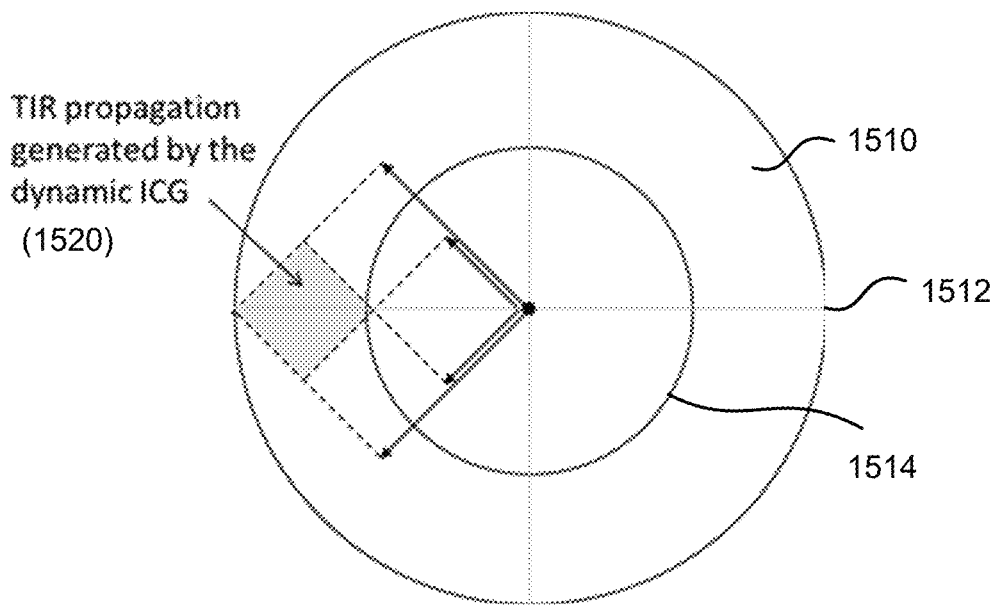
FIG. 15 shows a k-vector diagram of a 2D dynamic ICG for a normal incident input beam superimposed on a waveguide total internal reflection (TIR) diagram, according to some embodiments.

To show the propagation inside the eyepiece waveguide, it may be useful to overlay the above diagram with the waveguide TIR diagram, as illustrated in FIG. 15. The annular region 1510 bounded by the two circles 1512 and 1514 represent the k space where TIR can occur in the waveguide. The overlap of the dynamic grating region 1520 (i.e., the shaded region) and the TIR annular region 1510 represents the k space where the diffracted light beams generated by the 2D dynamic ICG may propagate in the waveguide via TIR.

Figure 16:
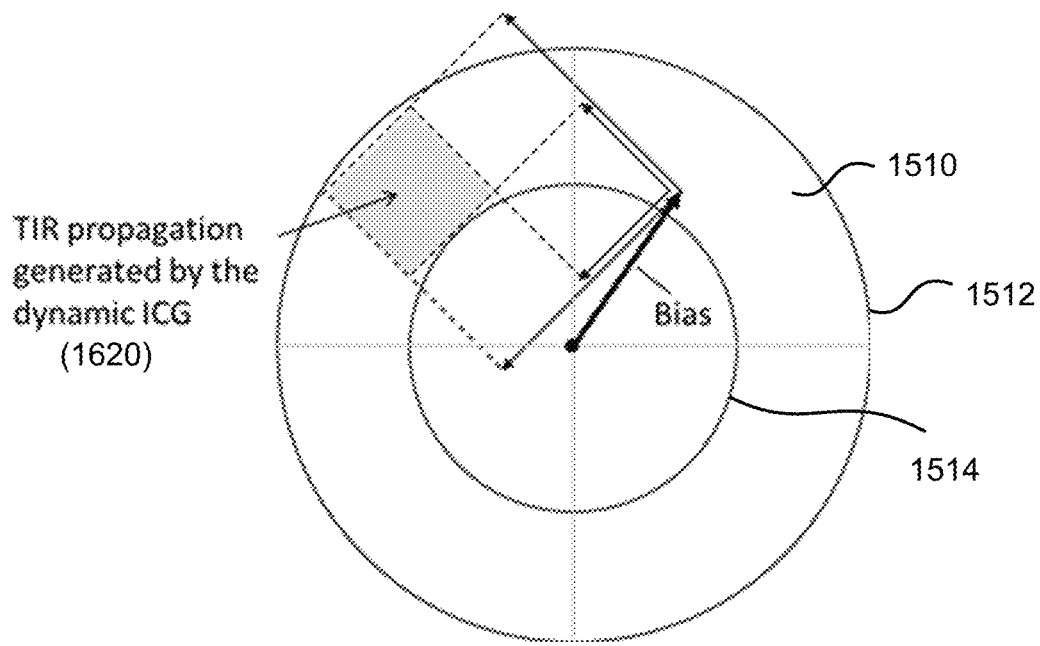
FIG. 16 shows a k-vector diagram of a 2D dynamic ICG for an input beam with an angular bias, superimposed on a waveguide total internal reflection (TIR) diagram, according to some embodiments.

An angular bias can be applied to improve the TIR region utilization, as illustrated in FIG. 16. For example, notice a larger shaded region 1620 in FIG. 16 as compared to the shaded region 1520 shown in FIG. 15.

Figure 17:
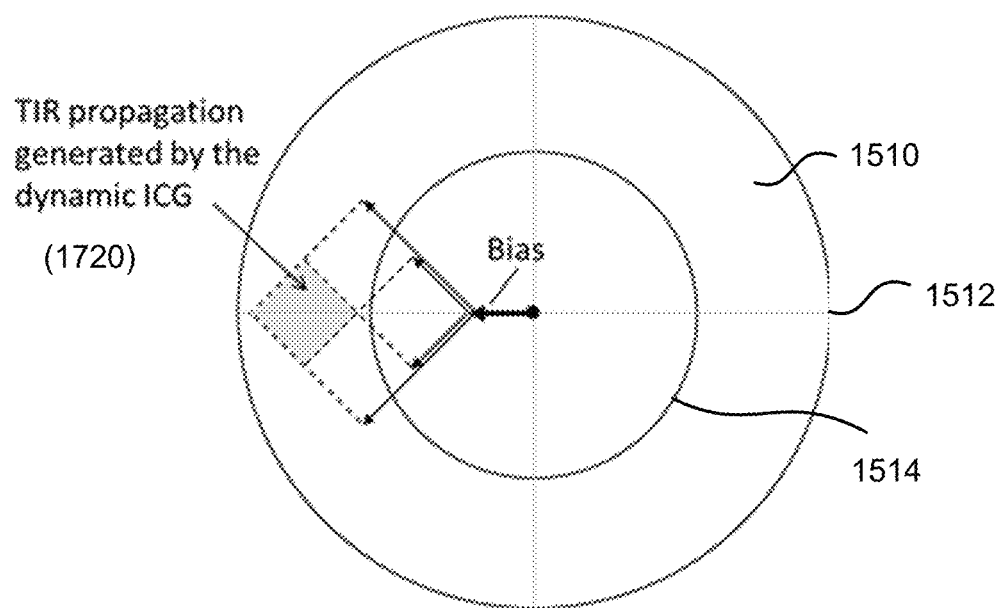
FIG. 17 shows a k-vector diagram of a 2D dynamic ICG for an input beam with an angular bias to shift the dynamic grating region to the TIR region, superimposed on a waveguide total internal reflection (TIR) diagram, according to some embodiments.

For relatively small dynamic grating vectors, the dynamic grating region may reside outside the TIR region 1510. In such cases, an angular bias may be used to shift the dynamic grating region 1720 to the TIR region 1510, as illustrated in FIG. 17. As described above, the bias may be introduced by using a specific external incident angle (as illustrated in FIG. 10A), or by using a static grating (as illustrated in FIG. 10B).

In summary, the concept of a very compact eyewear using a dynamic ICG is presented. A dynamic ICG may be configured to scan a fixed input laser beam into a range of two dimensional TIR angles in an eyepiece. By modulating the laser beam intensity as a function of the image point location, an observer may see a full image field. This new imaging paradigm may eliminate the need for an external projector and therefore may enable the construction of a very compact eyewear.

Figure 18:
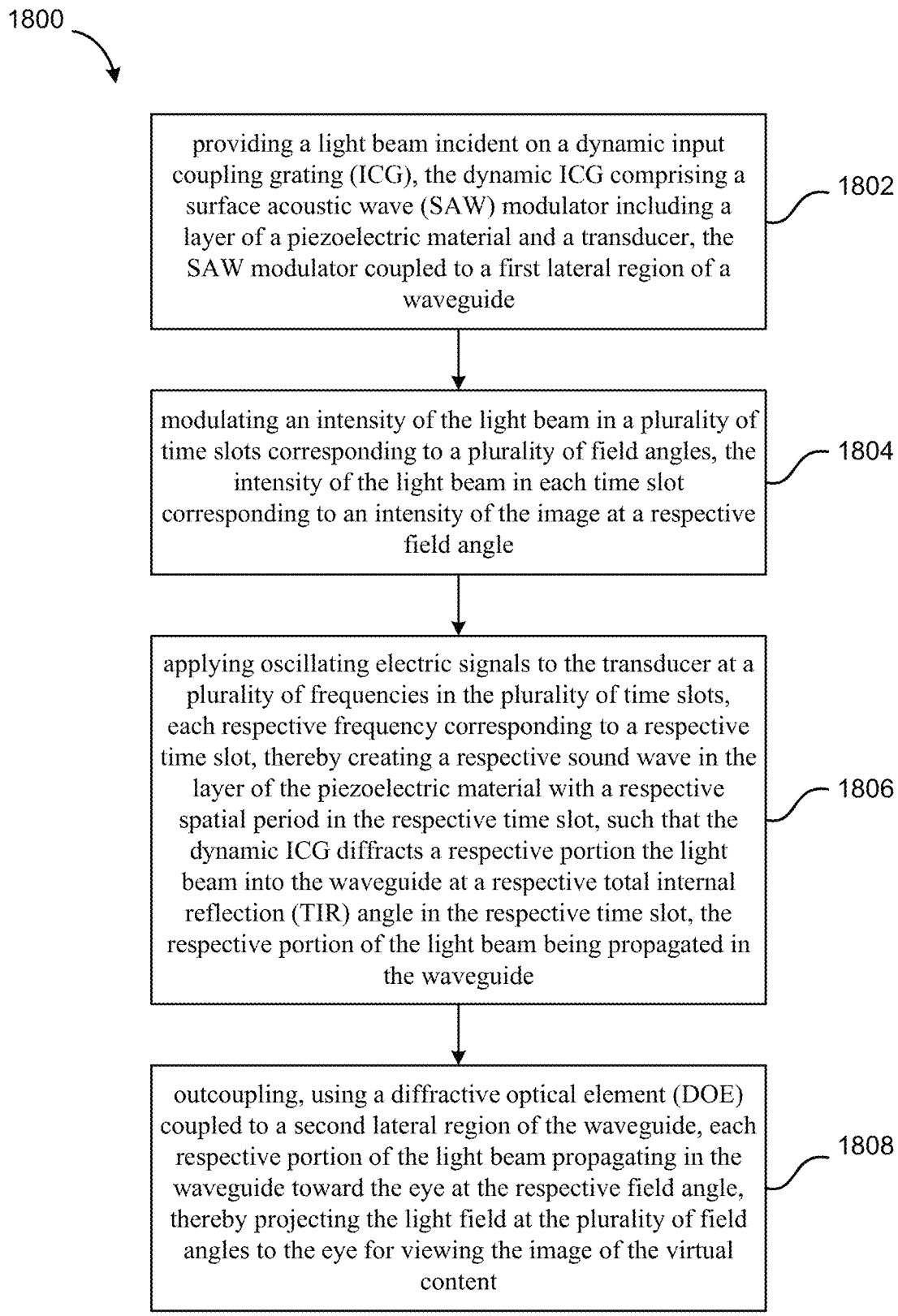
FIG. 18 is a simplified flowchart illustrating a method of projecting a light field to an eye of a viewer for viewing an image of virtual content, according to some embodiments.

FIG. 18 is a flowchart illustrating a method 1800 of projecting a light field to an eye of a viewer for viewing an image of virtual content, according to some embodiments. Any suitable components, assemblies, and approaches can be used to accomplish the method 1800 including, but not limited to, any suitable components, assemblies, and approaches described herein.

The method 1800 may include, at 1802, providing a light beam incident on a dynamic input coupling grating (ICG). The dynamic ICG may include a surface acoustic wave (SAW) modulator. The SAW modulator may include a layer of a piezoelectric material and a transducer. The SAW modulator may be coupled to a first lateral region of a waveguide.

The method 1800 may further include, at 1804, modulating an intensity of the light beam in one or more time slots corresponding to one or more field angles. The intensity of the light beam in each time slot corresponds to an intensity of the image at a respective field angle. The method 1800 may further include, at 1806, applying oscillating electric signals to the transducer at one or more frequencies in the plurality of time slots. Each respective frequency corresponds to a respective time slot. Therefore, a respective sound wave is created in the layer of the piezoelectric material with a respective spatial period in the respective time slot, such that the dynamic ICG diffracts a respective portion the light beam into the waveguide at a respective total internal reflection (TIR) angle in the respective time slot. The respective portion of the light beam propagates in the waveguide.

The method 1800 may further include, at 1808, outcoupling, using a diffractive optical element (DOE) coupled to a second lateral region of the waveguide, each respective portion of the light beam propagating in the waveguide toward the eye at the respective field angle. Therefore, the light field at the one or more field angles is projected to the eye for viewing the image of the virtual content.

It should be appreciated that the specific acts illustrated in FIG. 18 provide a particular method of projecting a light field to an eye of a viewer for viewing an image of virtual content, according to some embodiments. Other sequences of acts may also be performed according to some embodiments. For example, some embodiments may perform the acts outlined above in a different order. Moreover, the individual acts illustrated in FIG. 18 may include multiple sub-acts that may be performed in various sequences as appropriate to the individual act. Furthermore, additional acts may be added or removed depending on the particular applications. One of ordinary skill in the art would recognize many variations, modifications, and alternatives.

Figure 19:
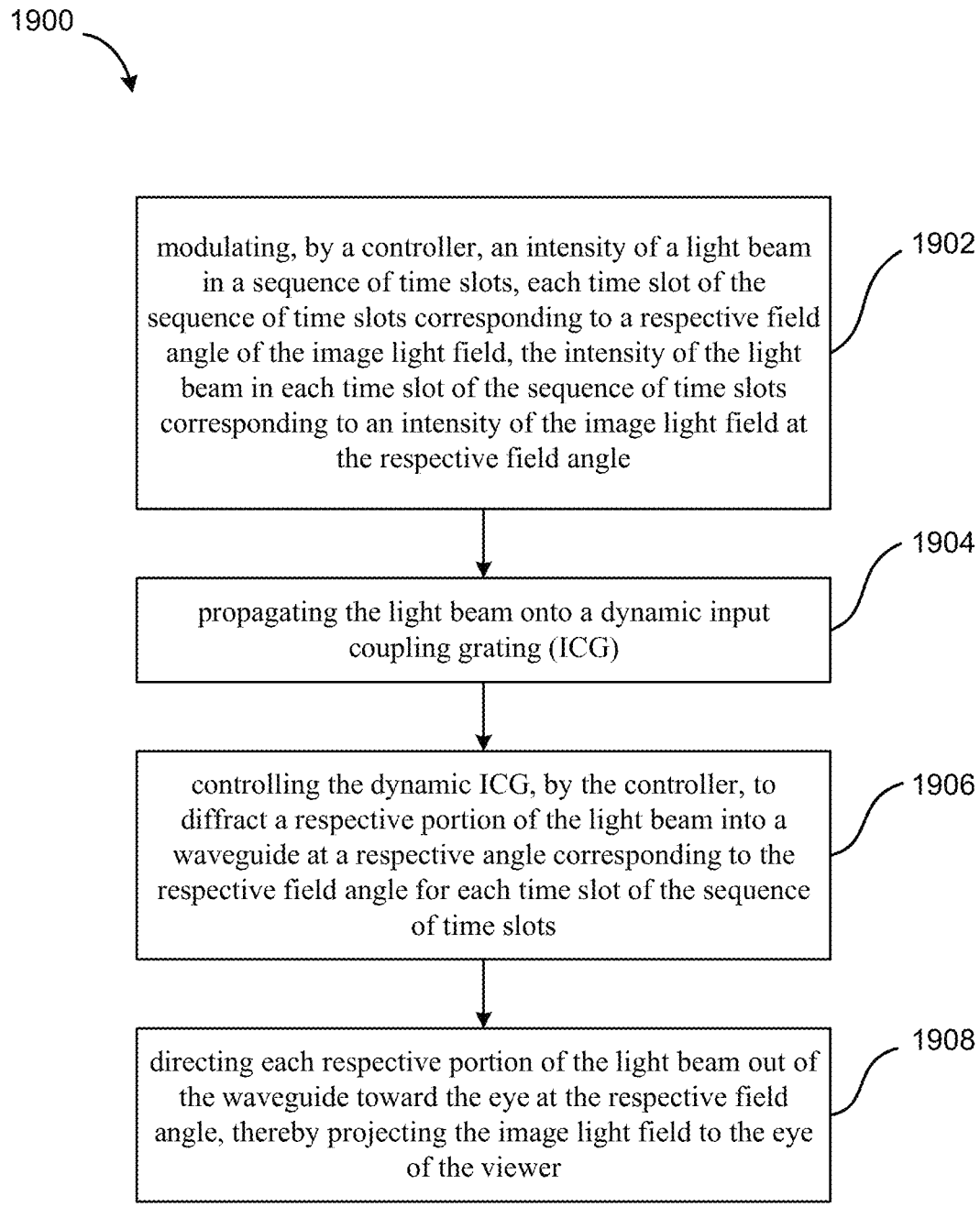
FIG. 19 is a flowchart illustrating a method of projecting an image light field to an eye of a viewer, according to some embodiments.

FIG. 19 is a flowchart illustrating a method 1900 of projecting an image light field to an eye of a viewer, according to some embodiments. Any suitable components, assemblies, and approaches can be used to accomplish the method 1900 including, but not limited to, any suitable components, assemblies, and approaches described herein.

The method 1900 includes, at 1902, modulating, by a controller, an intensity of a light beam in a sequence of time slots. Each time slot of the sequence of time slots corresponds to a respective field angle of the image light field. The intensity of the light beam in each time slot of the sequence of time slots corresponds to an intensity of the image light field at the respective field angle.

The method 1900 includes, at 1904, propagating the light beam onto a dynamic input coupling grating (ICG). In many embodiments, the light beam is propagated to the dynamic ICG on a fixed optical path without any transverse scanning of the light beam or variation in the light beam transverse to the fixed optical path. In many embodiments, the light beam is propagated to a fixed point on the ICG. Accordingly, a light source used to generate and transmit the light beam onto the dynamic ICG can have a reduced size relative to light sources configured for two-dimensional scanning of the light beam or two-dimensional variation in the light beam transverse to the propagation direction of the light beam.

The method 1900 includes, at 1906, controlling the dynamic ICG, by the controller, to diffract a respective portion of the light beam into a waveguide at a respective angle corresponding to the respective field angle for each time slot of the sequence of time slots. In many embodiments, the controller controls the modulation of the intensity of the light beam in conjunction with control of the dynamic ICG so as to effect two-dimensional scanning of the light beam to form the image light field projected to the eye of the viewer.

The method 1900 includes, at 1908, directing each respective portion of the light beam out of the waveguide toward the eye at the respective field angle, thereby projecting the image light field to the eye of the viewer. Therefore, the image light field at the one or more field angles is projected to the eye of the viewer. The method 1900 can be used to project the image light field to the eye of the viewer in any suitable application including, but not limited to, superimposing the image light field on an external image viewed by the eye of the viewer.

It should be appreciated that the specific acts illustrated in FIG. 19 provide a particular method of projecting an image light field to an eye of a viewer, according to some embodiments. Other sequences of acts may also be performed according to some embodiments. For example, some embodiments may perform the acts outlined above in a different order. Moreover, the individual acts illustrated in FIG. 19 may include multiple sub-acts that may be performed in various sequences as appropriate to the individual act. Furthermore, additional acts may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An eyepiece for projecting an image light field to an eye of a viewer, the eyepiece comprising:
    a waveguide configured to propagate light via total internal reflection (TIR) inside the waveguide between a first surface of the waveguide and a second surface of the waveguide opposing the first surface;
    a dynamic input coupling grating (ICG) formed as an integral part on the first surface of the waveguide in a first lateral region of the waveguide and configured to diffract light into the waveguide as a TIR beam;
    a light source configured to generate a light beam transmitted to the dynamic ICG;
    a controller coupled to the light source and the dynamic ICG, the controller being configured to:
        modulate an intensity of the light beam in a sequence of time slots, each time slot of the sequence of time slots corresponding to a respective field angle of a pixel in the image light field, the intensity of the light beam in each time slot of the sequence of time slots corresponding to an intensity of the pixel in the image light field at the respective field angle; and
        control the dynamic ICG to, for each time slot of the sequence of time slots, diffract a respective portion of the light beam into the waveguide at a respective angle corresponding to the respective field angle of the pixel prior to propagation by total internal reflection inside the waveguide; and
    an exit pupil expander coupled to a second lateral region of the waveguide and configured to direct each respective portion of the light beam out of the waveguide toward the eye of the viewer at the respective field angle, thereby projecting the image light field to the eye of the viewer.

2. The eyepiece of claim 1, wherein the dynamic ICG comprises a surface acoustic wave (SAW) modulator coupled to an oscillating electric signal source operable, under control of the controller, to supply an oscillating electric signal to the SAW modulator to generate respective acoustic waves that propagate on a surface of the SAW modulator such that the SAW modulator diffracts the respective portion of the light beam into the waveguide at the respective angle in each respective time slot.

3. The eyepiece of claim 2, wherein:
    the SAW modulator comprises a substrate and a transducer attached to the substrate; and
    the transducer is coupled to the oscillating electric signal source to drive the transducer to generate the respective acoustic waves.

4. The eyepiece of claim 3, wherein the transducer comprises a piezoelectric transducer.

5. The eyepiece of claim 2, wherein:
    the SAW modulator includes a substrate, a first transducer attached to the substrate, and a second transducer attached to the substrate;
    the first transducer is configured to vibrate in a first axis;
    the second transducer is configured to vibrate in a second axis orthogonal to the first axis; and
    the first transducer and the second transducer are coupled to the oscillating electric signal source to drive the first transducer and the second transducer to generate the respective acoustic waves.

6. The eyepiece of claim 2, wherein:
    the SAW modulator includes a substrate; and
    the substrate comprises a material that exhibits a piezoelectric effect that generates the respective acoustic waves.

7. The eyepiece of claim 6, wherein the material that exhibits the piezoelectric effect comprises one of fused silica, lithium niobate, arsenic trisulfide, tellurium dioxide, tellurite glass, or lead silicate.

8. The eyepiece of claim 1, wherein the light beam is incident on a surface of the dynamic ICG along a direction perpendicular to the surface of the dynamic ICG.

9. The eyepiece of claim 1, wherein the light beam is incident on a surface of the dynamic ICG at a non-zero bias angle relative to a direction perpendicular to the surface of the dynamic ICG.

10. The eyepiece of claim 1, wherein the dynamic ICG operates in a transmission mode.

11. The eyepiece of claim 1, wherein the dynamic ICG operates in a reflection mode.

12. The eyepiece of claim 11, further comprising a static grating coupled to the waveguide, the static grating being configured to diffract a portion of the light beam towards the dynamic ICG at a non-zero bias angle relative to a direction perpendicular to a surface of the dynamic ICG.

13. The eyepiece of claim 1, wherein:
the light beam is incident on a surface of the dynamic ICG via propagation of the light beam in a first direction;
the intensities of the light beam in the sequence of time slots correspond to intensities of the image light field in a first range of angular field of view (FOV);
the light source is further configured to generate a second light beam transmitted to the dynamic ICG;
the second light beam is incident on the surface of the dynamic ICG via propagation of the second light beam in a second direction different from the first direction; and
the intensities of the second light beam in the sequence of time slots correspond to intensities of the image light field in a second range of angular FOV different from the first range of angular FOV.

14. The eyepiece of claim 1, wherein the waveguide is transparent so that the image light field is superimposed on an external image transmitted through the waveguide to the eye of the viewer.

15. The eyepiece of claim 1, wherein the exit pupil expander comprises a diffractive optical element (DOE) configured to diffract each respective portion of the light beam out of the waveguide toward the eye of the viewer at the respective field angle.

16. The eyepiece of claim 1, wherein the light beam propagates to the dynamic ICG on an optical axis having a fixed position and orientation relative to the dynamic ICG.

17. A method of projecting an image light field to an eye of a viewer, the method comprising:
modulating, by a controller, an intensity of a light beam in a sequence of time slots, each time slot of the sequence of time slots corresponding to a respective field angle of a pixel in the image light field, the intensity of the light beam in each time slot of the sequence of time slots corresponding to an intensity of the pixel in the image light field at the respective field angle;
propagating the light beam onto a dynamic input coupling grating (ICG), wherein the dynamic ICG is formed on a waveguide having a first surface and a second surface opposing the first surface, wherein the dynamic ICG is formed as an integral part on the first surface of the waveguide in a first lateral region of the waveguide and configured to diffract light into a waveguide as a total internal reflection (TIR) beam;
controlling the dynamic ICG, by the controller, to diffract a respective portion of the light beam into the waveguide at a respective angle corresponding to the respective field angle of the pixel for each time slot of the sequence of time slots prior to propagation by TIR inside the waveguide; and
directing each respective portion of the light beam out of the waveguide toward the eye at the respective field angle, thereby projecting the image light field to the eye of the viewer.

18. The method of claim 17, wherein:
the dynamic ICG comprises a surface acoustic wave (SAW) modulator coupled to an oscillating electric signal source; and
the method includes controlling operation of the oscillating electric signal source, by the controller, to supply an oscillating electric signal to the SAW modulator to generate respective acoustic waves that propagate on a surface of the SAW modulator such that the SAW modulator diffracts the respective portion of the light beam into the waveguide at the respective angle in each respective time slot.

19. The method of claim 18, wherein:
the SAW modulator comprises a substrate and a piezoelectric transducer attached to the substrate;
the oscillating electric signal is supplied to the piezoelectric transducer to generate the respective acoustic waves; and
the respective acoustic waves propagate on a surface of the substrate.

* * * * *